United States Patent
Koike et al.

(10) Patent No.: US 8,165,641 B2
(45) Date of Patent: Apr. 24, 2012

(54) NOISE SUPPRESSION SYSTEM, SOUND ACQUISITION APPARATUS, SOUND OUTPUT APPARATUS, AND COMPUTER-READABLE MEDIUM

(75) Inventors: Atsushi Koike, Setagaya-ku (JP); Masahito Togami, Higashiyamato (JP)

(73) Assignee: Casio Hitachi Mobile Communications Co., Ltd, Tokyo (JP)

( * ) Notice: Subject to any disclaimer, the term of this patent is extended or adjusted under 35 U.S.C. 154(b) by 845 days.

(21) Appl. No.: 12/179,776

(22) Filed: Jul. 25, 2008

(65) Prior Publication Data

US 2009/0030654 A1    Jan. 29, 2009

(30) Foreign Application Priority Data

Jul. 26, 2007   (JP) .................................. 2007-195219

(51) Int. Cl.
*H04M 1/00*   (2006.01)
(52) U.S. Cl. ......................... 455/567; 455/517; 455/557
(58) Field of Classification Search .................. 455/567, 455/517, 557–558
See application file for complete search history.

(56) References Cited

U.S. PATENT DOCUMENTS

| 2006/0141927 A1 | 6/2006 | Koike |
| 2006/0182291 A1* | 8/2006 | Kunieda et al. ............... 381/110 |
| 2006/0211444 A1 | 9/2006 | Koike et al. |
| 2006/0268336 A1 | 11/2006 | Sakaniwa et al. |

FOREIGN PATENT DOCUMENTS

| JP | 2003-124849 | 4/2003 |
| JP | 2004-080143 | 3/2004 |
| JP | 2006-340321 | 12/2006 |
| KR | 20050054399 | 6/2005 |

* cited by examiner

*Primary Examiner* — Lana N Le
(74) *Attorney, Agent, or Firm* — Cozen O'Connor

(57) ABSTRACT

The sound acquisition apparatus broadcasts a sound "output notice request" through a communication network. In response to the request by the sound acquisition apparatus, the sound output apparatus gives notification of starting a sound output operation, the sound acquisition apparatus requests the sound output apparatus to transfer "output sound data". The sound output apparatus then transfers "output sound data" representing the sound outputted by its own speaker to the sound acquisition apparatus in response to this request. The sound acquisition apparatus then suppresses a noise component from sound data acquired through a microphone using the transferred "output sound data".

15 Claims, 14 Drawing Sheets

NOISE SUPPRESSION SYSTEM, SOUND ACQUISITION APPARATUS, SOUND OUTPUT APPARATUS, AND COMPUTER-READABLE MEDIUM

BACKGROUND OF THE INVENTION

1. Field of the Invention

The present invention relates to a noise suppression system, a sound acquisition apparatus, a sound output apparatus, and a computer-readable medium storing a program causing a computer to function as the sound acquisition apparatus or the sound output apparatus.

2. Description of the Related Art

Networking for electronic equipment used in households etc. is advancing to the point where not only information equipment such as personal computers but also household electrical goods such as audio equipment (for example, digital music players) and visual equipment (for example, televisions and image recording/reproducing equipment) are being connected to IP-based networks such as LAN (Local Area Network).

Further, mobile communication terminals such as mobile phones that are fitted with a wireless LAN function (so-called dual mode terminals) also exist that are capable of connecting to IP networks such as LAN.

Various electronic equipments can then be connected to an IP network so as to enable cooperative operation between equipment or remote operation by a user. The types of equipment that are becoming networked are tending to increase. In addition to image recording units such as video cameras and digital still cameras, it is also predicted that typical household equipment such as refrigerators and washing machines will become networked.

The bulk of such electronic equipment handles sound. This means that noise relating to sound can be problematic. For example, when talking on a mobile phone while watching television broadcasting, there is the possibility that the called party will be able to hear the sound of the television. Recognition precision is also reduced in the case of speech recognition using a personal computer etc. when music is played back by audio equipment as a result of the impinging of replayed sound.

Sound noise also can occur as a result of so-called "acoustic echo". When audio is outputted from a speaker while sound is acquired by a microphone at equipment including both a speaker and a microphone, the sound outputted by the speaker becomes wrapped around and is picked-up by the microphone. The audio outputted by the speaker containing the audio picked-up by the microphone is referred to as an "acoustic echo" and is the cause of deterioration in the quality of sound acquired by the microphone and howling.

Technology referred to as "echo canceling" is widely employed to suppress acoustic echoes in telephone terminals etc. "Echo canceling" refers to sound output from a speaker that is taken as a reference signal. Acoustic echo estimated based on this reference signal is then suppressed in the sound acquired by the microphone.

This "echo canceling" is disclosed in Unexamined Japanese Patent Application KOKAI Publication No. 2003-124849 etc. This echo canceller reads in inputted sound (speaker output sound) outputted by the speaker as a reference signal, generates a pseudo echo, and subtracts this pseudo echo from the audio inputted from the microphone in order to suppress acoustic echo.

This echo canceller is pre-recorded with audio data for specific noise such as the sound of vehicle windscreen wipers. When a specific noise is then detected, the pre-recorded audio data is referred to and specific sounds are suppressed in the acquired sound.

SUMMARY OF THE INVENTION

The echo canceller of the related art described above is capable of acquiring a signal inputted to its own speaker as a reference signal. However, in a system constructed so that the sound output apparatus and the sound acquisition apparatus are connected via a communication network, the sound acquisition apparatus and the sound output apparatus are independent apparatuses. The sound acquisition apparatus therefore cannot obtain an accurate reference signal from the sound output apparatus. This means that even if a reference signal is sent from the sound output apparatus to the sound acquisition apparatus, the transmission characteristics change substantially depending on the state of the communication network. It is therefore difficult to acquire a reference signal accurately.

Further, the echo canceller is for suppressing specific noise and is not compatible with when arbitrary sound is outputted such as with a speaker for external equipment.

In order to resolve the problems described above, it is an object of the present invention to effectively suppress acoustic echo occurring as a result of sound outputted by external equipment from acquired sound.

It is a further object of the present invention to synchronize a signal of acquired sound and a signal acquired by a microphone, in order to effectively suppress noise, even in cases where the sound signal supplied to the speaker cannot be directly acquired.

In order to achieve the above objects, a noise suppression system of a first aspect of the present invention is a noise suppression system comprising at least one sound acquisition apparatus for acquiring sounds and at least one sound output apparatus for outputting sounds being connected to each other via a communication network, wherein the sound acquisition apparatus may comprise:

a sound data obtaining unit that obtains sound data representing sound outputted by the sound output apparatus, in response to start of a sound acquisition operation by the sound acquisition apparatus or in response to start of a sound output operation by the sound output apparatus; and a noise suppression unit that suppresses sound outputted by the sound output apparatus using the sound data obtained by the sound data obtaining unit.

In order to achieve the above objects, a sound acquisition apparatus of a second aspect of the present invention may be a sound acquisition apparatus connected to a sound output apparatus via a communication network, which acquires sounds and utilizes the acquired sounds, may comprises:

a sound data obtaining unit that obtains sound data representing sound outputted by the sound output apparatus, in response to start of a sound acquisition operation by the sound acquisition apparatus or in response to start of a sound output operation by the sound output apparatus; and a noise suppression unit that suppresses sound outputted by the sound output apparatus from the acquired sound using sound data obtained by the sound data obtaining unit.

In order to achieve the above objects, a sound output apparatus of a third aspect of the present invention may be a sound output apparatus connected to a sound acquisition apparatus via a communication network (NW1), which outputs sounds based on sound data, comprising:

a request receiving unit that receives an "output notice request" requesting the sound output apparatus to notify the sound acquisition apparatus when the sound output apparatus starts a sound output operation and a "transfer stop request" requesting the sound output apparatus to stop sound data transfer operation, those broadcasted by the sound acquisition apparatus through the communication network; and a sound data transfer unit that transfers sound data representing sound being outputted by the sound output apparatus to the sound acquisition apparatus via the communication network, in a case where the sound output apparatus carries out a sound output operation within a term from a point where the request receiving unit receives the "output notice request" from the sound acquisition apparatus to a point where the request receiving unit receives the transmission stop request from the sound acquisition apparatus which is the sender of the received "output notice request".

In order to achieve the above objects, a sound output apparatus of a fourth aspect of the present invention may be a sound output apparatus connected to a sound acquisition apparatus via a communication network, which outputs sounds based on sound data, comprising:

a notification unit that broadcasts a start notice indicating that the sound output apparatus carries out the sound output operation through the communication network; and a sound data transfer unit that transfers sound data representing the sound being outputted by the sound output apparatus to the sound acquisition apparatus which responds to the start notice, via the communication network.

In order to achieve the above objects, a computer-readable medium of a fifth aspect of the present invention may store a computer program that controls a computer of a sound acquisition apparatus connected to a sound output apparatus via a communication network, which acquires sounds and utilizes the acquired sounds, to implement:

a function of obtaining sound data representing sound being outputted by the sound output apparatus in response to start of a sound acquisition operation by the sound acquisition apparatus or in response to start of a sound output operation by the sound output apparatus; and a function of suppressing sound outputted by the sound output apparatus from the acquired sound, using the obtained sound data.

In order to achieve the above objects, a computer-readable medium of a sixth aspect of the present invention may store a computer program that controls a computer of a sound output apparatus connected to a sound acquisition apparatus via a communication network, which outputs sounds based on sound data, to implement:

a function of receiving an "output notice request" requesting the sound output apparatus to notify start of a sound output operation by the sound output apparatus and a "transfer stop request" requesting the sound output apparatus to stop the sound data transfer to the sound acquisition apparatus, those broadcasted by the sound acquisition apparatus through the communication network; and a function of transferring sound data representing sound being outputted by the sound output apparatus to the sound acquisition apparatus via the communication network, when the sound output apparatus starts to output the sound during a term from a point where the sound output apparatus receives the "output notice request" from the sound acquisition apparatus to a point where the sound output apparatus receives the "transfer stop request" from the sound acquisition apparatus which is the sender of the received "output notice request".

In order to achieve the above objects, a computer-readable medium of a seventh aspect of the present invention may store a computer program that controls a computer of a sound output apparatus connected to a sound acquisition apparatus via a communication network, which outputs sounds based on sound data, to implement:

a function of broadcasting a start notice indicating that the sound output apparatus carries out a sound output operation, through the communication network; and a function of transferring sound data representing sound being output by the sound output apparatus, to the sound acquisition apparatus which responds to the start notice, via the communication network.

Effects Of The Invention

According to the present invention, contaminated sounds outputted by nearby apparatus are suppressed effectively.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

First Embodiment

Figure 1:
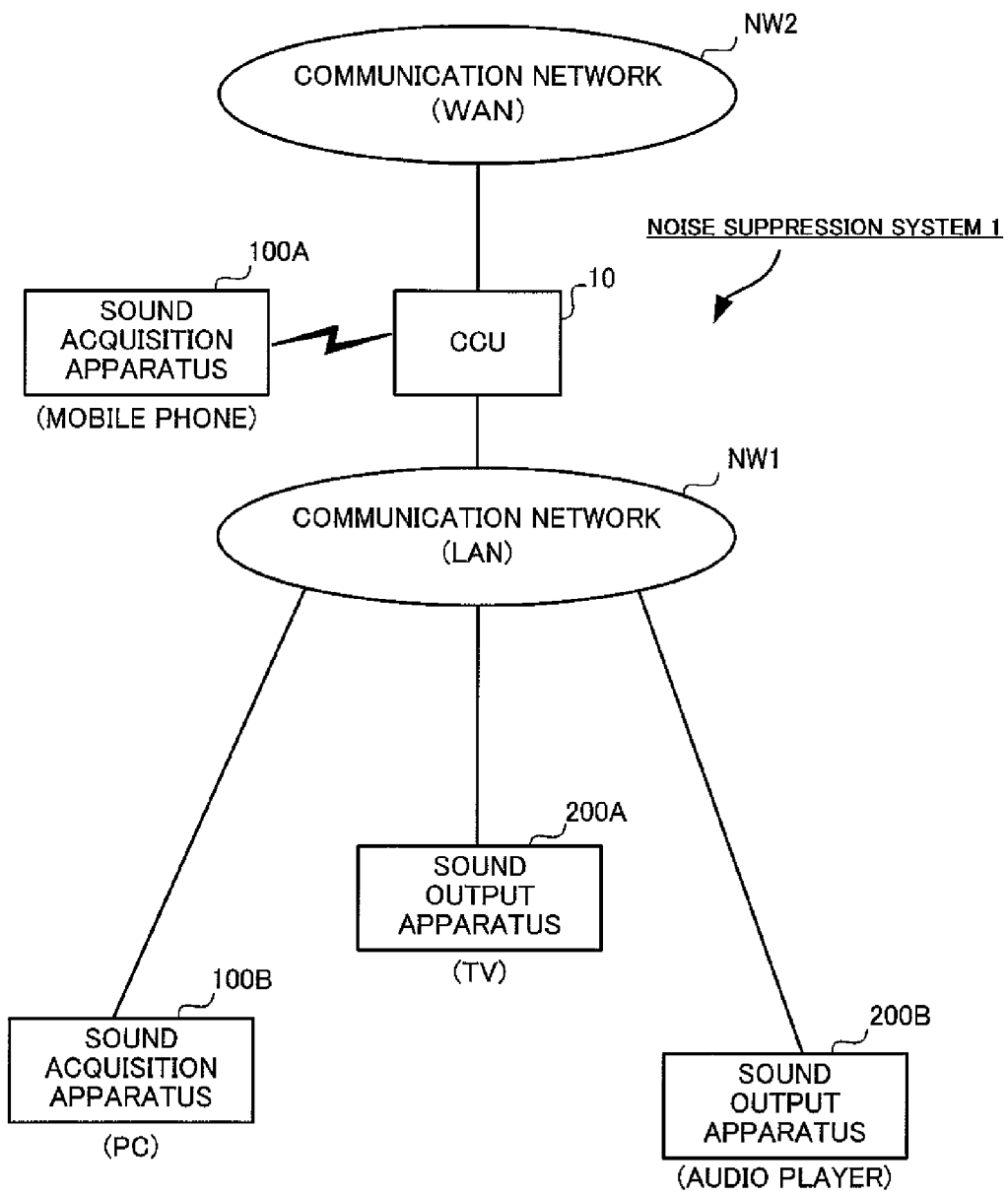
FIG. 1 is a schematic view of an example of a noise suppression system of exemplary embodiments of the present invention.

The following is a description of a noise suppression system of a first embodiment of the present invention. As shown in FIG. 1, the noise suppression system 1 of this embodiment may include sound acquisition apparatuses 100 (a sound acquisition apparatus 100A and a sound acquisition apparatus 100B) and sound output apparatuses 200 (a sound output apparatus 200A and a sound output apparatus 200B), that are connected to each other via a communication network NW1.

The communication network NW1 is, for example, a LAN (Local Area Network) such as an IEEE802.3 standard LAN that enables the sound acquisition apparatuses 100 and the sound output apparatuses 200 constituting the noise suppression system 1 to communicate with each other in a wired or wireless manner. The number of sound acquisition apparatuses 100 and the sound output apparatuses 200 in the noise suppression system 1 is arbitrary.

The sound acquisition apparatus 100 is an apparatus having an audio acquisition function such as, for example, a mobile terminal, i.e. a mobile communication terminal such as a mobile phone or an IP telephone terminal, a video camera, a voice recorder, or equipment having a speech recognition function. The sound acquisition apparatus is at least capable of being connected to the communication network NW1.

The sound output apparatus 200 is an apparatus having an audio output function such as, for example, an audio player, a television, or a household appliance (for example, a refrigerator or a washing machine) capable of sounding an alarm, and is at least capable of being connected to the communication network NW1.

In this embodiment, the sound acquisition apparatus 100A may be a mobile phone, the sound acquisition apparatus 100B may be a personal computer (PC), the sound output apparatus 200A may be a television (TV), and the sound output apparatus 200B may be an audio player.

In this event, each of the sound acquisition apparatuses 100 and the sound output apparatuses 200 in the noise suppression system 1 may be typical electronic equipment used in a household that are connected to the communication network NW1 so as to be capable of communicating with each other based on a standard LAN specification or DLNA (Digital Living Network Alliance) specification.

Here, the communication network NW1 is also taken to be connected to a communication network NW2 that is a WAN (Wide Area Network) via a communication control unit (CCU) 10 such as a router or a modem. Each apparatus connected to the communication network NW1 can then be connected to external networks such as the Internet as necessary.

The communication control unit 10 carries out operations necessary for connecting the sound acquisition apparatus 100 and the sound output apparatus 200 to the communication network NW1. The communication control unit 10 is taken to have an address assigning function such as DHCP (Dynamic Host Configuration Protocol) or UPnP (Universal Plug and Play). Each of the sound acquisition apparatuses 100 and the sound output apparatuses 200 are therefore assigned with addresses (IP addresses) necessary for communication using the communication network NW1 by the communication control unit 10. In this case, it is taken that each of the sound acquisition apparatuses 100 and the sound output apparatuses 200 are assigned with IP addresses belonging to the same network address. Further, in this embodiment, since the communication network NW1 is LAN, the IP addresses assigned to each unit may be therefore private IP addresses.

Further, if the sound acquisition apparatus 100 and/or the sound output apparatus 200 have wireless communication function for connecting to the communication network NW1, the communication control unit 10 may include an access point function for carrying out wireless communication. In this case, the communication control unit 10 may have a wireless communication unit conforming to the wireless LAN (WLAN) standard such as, for example, IEEE802.11 series. In this embodiment, the sound acquisition apparatus 100A that is a mobile phone has a WLAN function. In this case, the sound acquisition apparatus 100A accesses the communication control unit 10 acting as a WLAN access point, when the sound acquisition apparatus 100A establishes connection to the communication network NW1.

A detailed description is now given of the sound acquisition apparatuses 100 and the sound output apparatuses 200 in the noise suppression system 1.

First, the sound acquisition apparatus 100 will now be described. As described above, the sound acquisition apparatus 100 is an apparatus such as a telephone terminal having a function for acquiring sounds. In this embodiment, the sound acquisition apparatus 100A and the sound acquisition apparatus 100B are the same in the configuration necessary for implementing the operation of the present invention.

Figure 2:
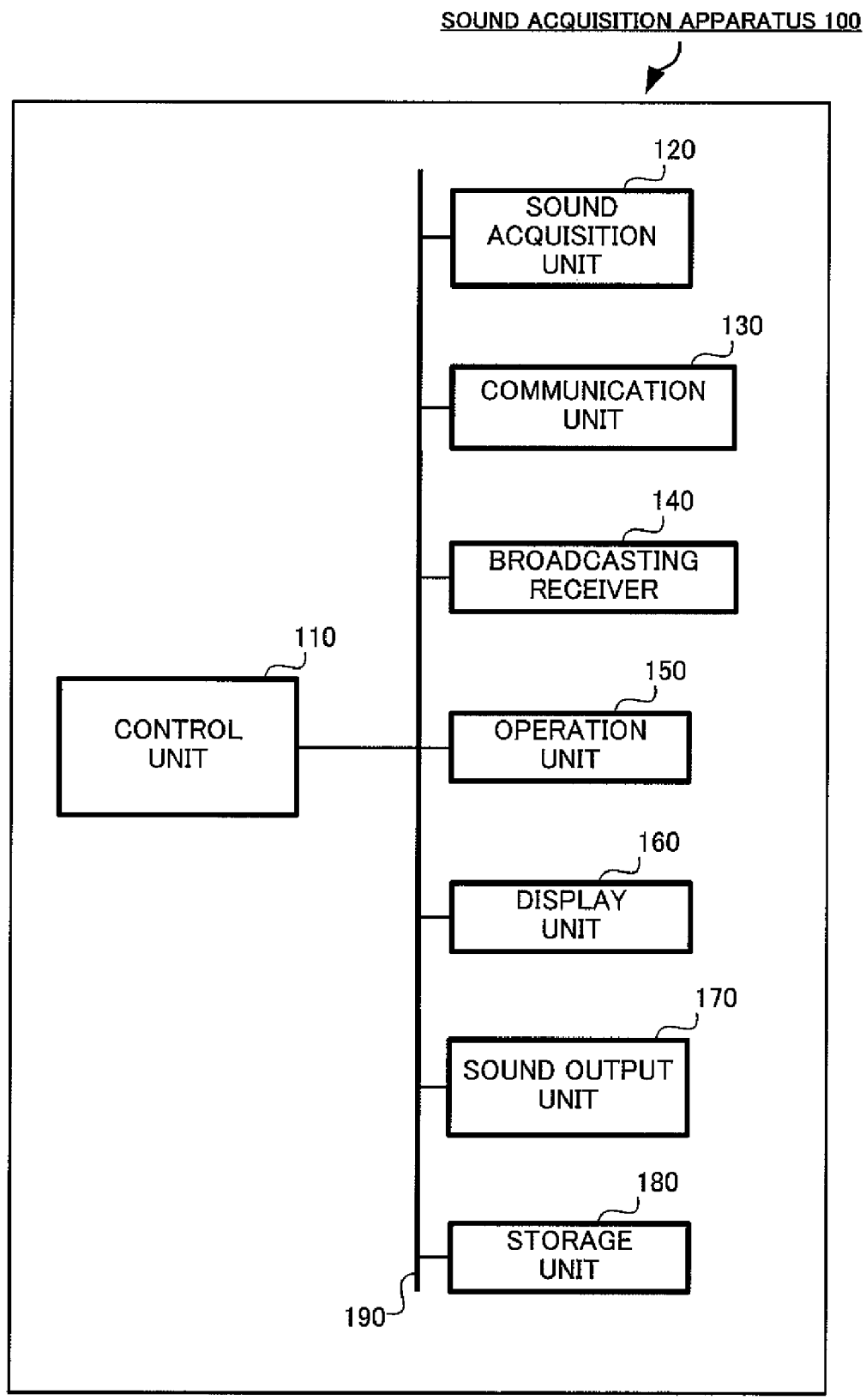
FIG. 2 is a block diagram showing an example of a sound acquisition apparatus.

The structure for the sound acquisition apparatus 100 will now be described with reference to FIG. 2. FIG. 2 is a block diagram showing a configuration of the sound acquisition apparatus 100. As shown in FIG. 2, the sound acquisition apparatus 100 includes a control unit 110, a sound acquisition unit 120, a communication unit 130, a broadcasting receiver 140, an operation unit 150, a display unit 160, a sound output unit 170, a storage unit 180, a bus 190, and the like.

The control unit 110, for example, may include major elements for computing such as a CPU (Central Processing Unit) and a memory unit including a register, M (Random Access Memory) and the like. Thus structured control unit 110 executes programs to control other components in the sound acquisition apparatus 100.

The sound acquisition unit 120 may include a microphone, an ADC (Analog-Digital Converter), and the like. Thus structured sound acquisition unit 120 converts analog audio signals representing sounds acquired through the microphone to digital audio data (hereinafter, referred to as "acquired audio data").

The communication unit 130 is a communication unit that is an interface for connecting to other apparatuses via the communication network NW1. If the sound acquisition apparatus 100 employs wired communication to establish connection to the communication network NW1, the communication unit 130 may be an NIC (Network Interface Card) confirming to a typical LAN standard such as IEEE802.3. If the sound acquisition apparatus 100 employs wireless communication to establish connection to the communication network NW1, the communication unit 130 may be a WLAN module conforming to a typical WLAN standard such as IEEE802.11 series.

The broadcasting receiver 140 may incorporate the case where the sound acquisition apparatus 100 has a broadcasting receiving function. In this case, the broadcasting receiver 140 may include, for example, an antenna, a tuner unit, a decoder unit, and the like necessary for receiving and reproducing digital television broadcastings, digital radio broadcastings, or the like.

The operation unit 150 may include keys and buttons arranged to fit the type of sound acquisition apparatus 100, to generate input signals in response to user operations to be inputted to the control unit 110.

The display unit 160 may include, for example, a display panel such as an LCD (Liquid Crystal Display) panel, a driver circuit, and the like, and displays images based on image signals given by the control unit 110.

The sound output unit 170 may include a DAC (Digital-Analog Converter), a speaker, and the like. Thus structured sound output unit 170 modulates digital audio data obtained by the communication unit 130 via the communication network NW1 or broadcasted digital sound data received by the broadcasting receiver 140, and output sounds based on the modulated sound data.

The storage unit 180 may include, for example, semiconductor storage device such as a flash memory or a magnetic storage device such as a hard disk drive to save various data for the operations of the sound acquisition apparatus 100. Operation programs necessary for operations of the present invention and information relating to the sound acquisition apparatus 100 are stored in the storage unit 180. Information relating to the sound acquisition apparatus 100 may be an "acquisition device ID" etc. According to the acquisition device ID, the sound acquisition apparatus 100 can be identified among other apparatuses connected to the communication network NW1 can identify.

The bus 190 may comprise typical connectors and cables to deliver signals and data among the above described components in the sound acquisition apparatus 100.

The above description exemplifies a minimum structure of the sound acquisition apparatus 100 necessary for realizing the present invention. As described above, various apparatus having a sound acquiring function can act as the sound acquisition apparatus 100. Therefore, the sound acquisition apparatus 100 may include components other than the above described ones when deemed necessary by the form that the apparatus takes (detailed description of such optional components is omitted in this specification).

Next, the sound output apparatus 200 will be described. As described above, the sound output apparatus 200 is an apparatus such as a television or audio player having a function for outputting sound to outside.

Figure 3:
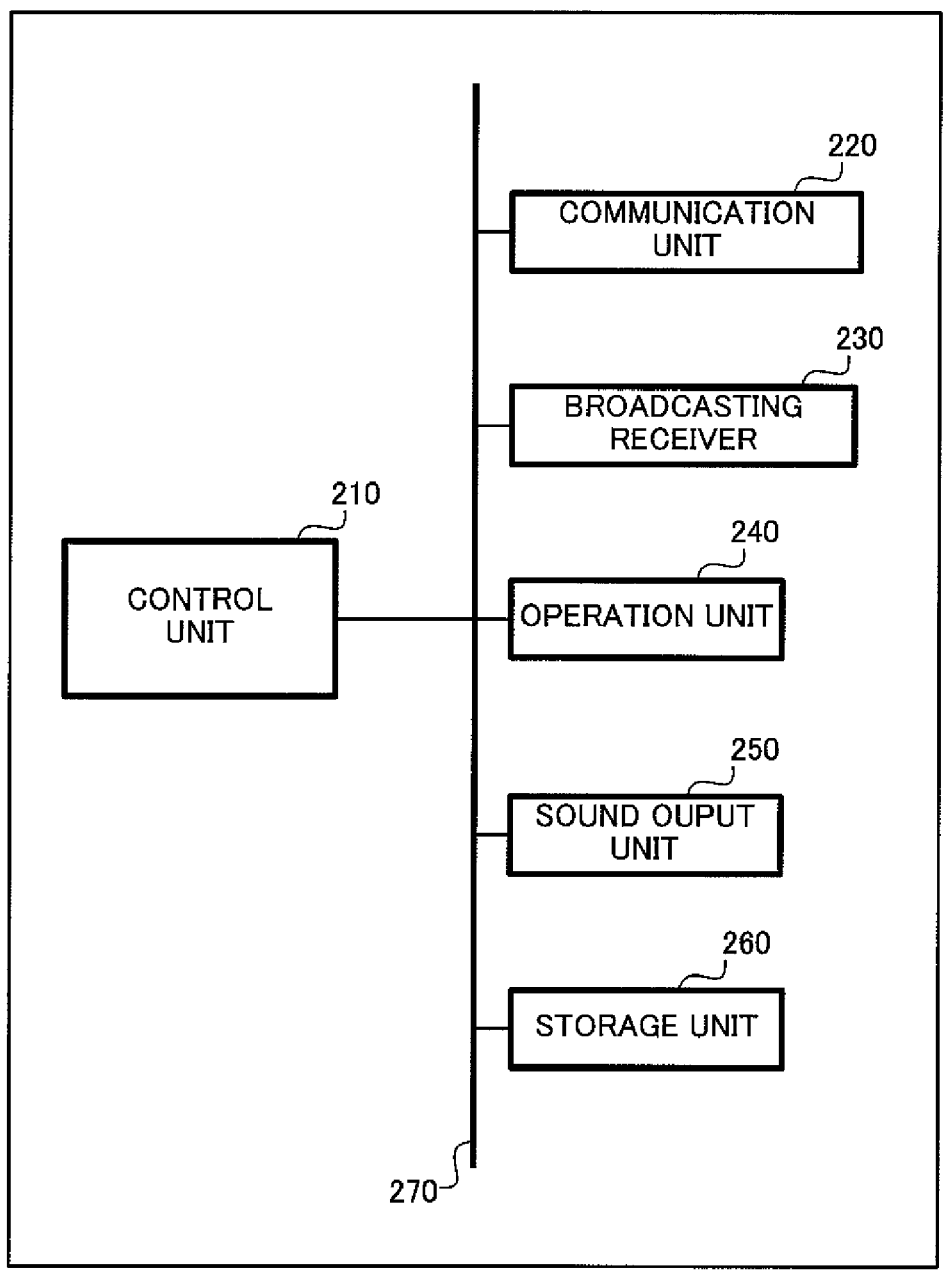
FIG. 3 is a block diagram showing an example of a sound output apparatus.

The structure for the sound output apparatus 200 is now described with reference to FIG. 3. In this embodiment, the sound output apparatus 200A and the sound output apparatus 200B are the same in a configuration necessary for implementing the operation of the present invention.

The following description exemplifies a minimum structure necessary for realizing the present invention. FIG. 3 is a block diagram showing a configuration for the sound output apparatus 200. As shown in FIG. 3, the sound output apparatus 200 includes a control unit 210, a communication unit 220, a broadcasting receiver 230, an operation unit 240, a sound output unit 250, a storage unit 260, a bus 270, and the like.

The control unit 210, for example, may include major elements for computing an operation unit such as a CPU and a memory unit including a register, RAM and the like. Thus structured control unit 210 executes programs to control other components in the sound output apparatus 200.

The communication unit 220 may include an NIC, a WLAN module, or the like as well as the communication unit 130, and carries out actions for communicating with other apparatuses via the communication network NW1 with sending and receiving data.

The broadcasting receiver 230 may be incorporated in the case where the sound output apparatus 200 has a broadcasting receiving function. In this case, the broadcasting receiver 230 may include, for example, an antenna, a tuner, a decoder, and the like necessary for receiving and reproducing digital television broadcastings, digital radio broadcastings, and the like.

The operation unit 240 may include keys and buttons arranged to fit the type of sound output apparatus 200, to generate input signals in response to user operations to be inputted to the control unit 210.

The sound output unit 250 may include a DAC (Digital-Analog Converter), a speaker, and the like to output sounds. For example, in a case where the sound output apparatus 200 is a television apparatus, the sound output unit 250 decodes digital audio data in television broadcasting received by the broadcasting receiver 230, and emits sounds based on the decoded sound data through the speaker. Or, in a case where the sound output apparatus 200 is an audio player, the sound output unit 250 decodes digital sound data in radio broadcasts received by the broadcasting receiver 230 or digital sound data downloaded by the communication unit 220 through the Internet or the like, and emits sounds based on the decoded sound data through the speaker. Or, if the sound output apparatus 200 is electric household equipment such as a refrigerator, a washing machine, or the like, the sound output unit 250 may generate alarm sounds and output them for cautioning.

The storage unit 260 may include, for example, semiconductor storage device such as a flash memory or a magnetic storage device such as a hard disk drive to save various data for the operation of the sound output apparatus 200. Operation programs necessary for realizing operations of the present invention and information relating to the sound output apparatus 200 are stored in the storage unit 260. Information relating to the sound output apparatus 200 may be an "output device ID" etc. According to the output device ID, the sound output apparatus 200 can be identified among other apparatuses connected to the communication network NW1.

The bus 270 may comprise typical connectors and cables to deliver signals and data among the above-described units in the sound output apparatus 200.

The above description exemplifies a minimum structure of the sound output apparatus 200 necessary for realizing the present invention. As described above, various apparatuses having a sound output function can act as the sound output apparatus 200. Therefore, the sound output apparatus 200 may include components other than the above described ones when deemed necessary by the form that the apparatus takes (detailed description of such optional components is omitted in this specification).

The operation of the noise suppression system 1 comprising thus structured sound acquisition apparatus 100 and sound output apparatus 200 is now described.

Figure 4:
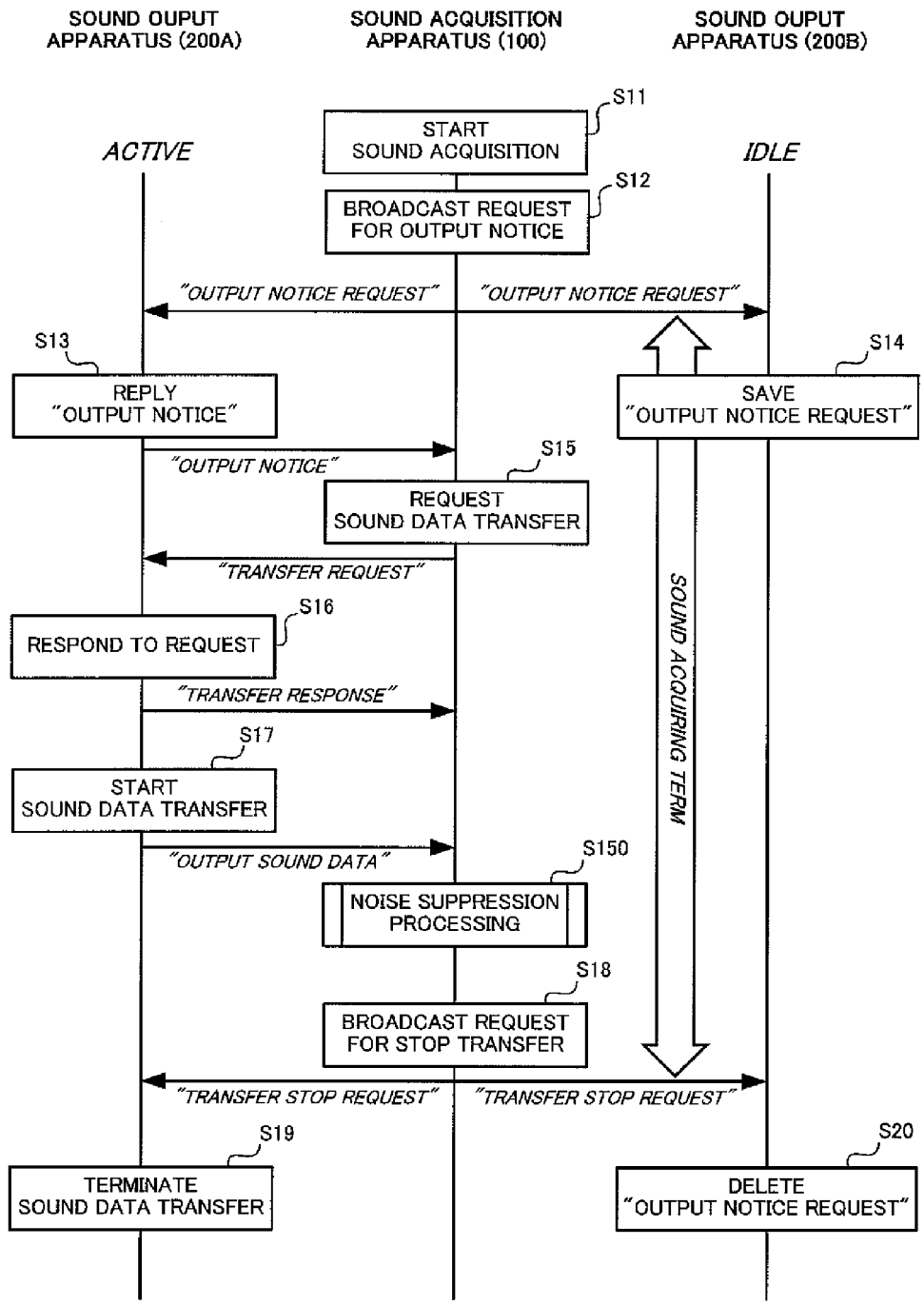
FIG. 4 is a sequence chart for explaining the operation of a first embodiment of the present invention.

First, the operation sequence for each apparatus when the sound acquisition apparatus 100 starts to acquire sound will now be outlined with reference to the sequence chart of FIG. 4.

A case where a telephone conversation takes place using the mobile phone (the sound acquisition apparatus 100A) while a user of it watches television through the television apparatus (the sound output apparatus 200A) will now be exemplified. In this example, at the time where the sound acquisition apparatus 100 starts to acquire sound, the sound output apparatus 200A is already outputting sound (active), but the sound output apparatus 200B is not outputting sound (idle).

The operation of acquiring sound by the sound acquisition apparatus 100A that is a mobile phone is the acquisition of what the user of the phone is saying when using the telephone function to talk. The scene assumed in this example is that the user of the sound acquisition apparatus 100A is talking on the telephone while watching television program being outputted by the sound output apparatus 200A. The speech spoken by the user and the sound of the television broadcasting outputted by the sound output apparatus 200A are inputted together to the sound acquisition apparatus 100A. At this time, the inputted sound of the television becomes noise for the telephone talk.

A description of the operation for suppressing such noise is given in the following. As shown in FIG. 4, when the sound acquisition operation starts (step S1), the sound acquisition apparatus 100 (=sound acquisition apparatus 100A) broadcasts "output notice request" to the communication network NW1 (step S12). The request is sent to "broadcast address", thus the request is broadcasted to all apparatuses having addresses belonging to the same network address in the communication network NW1. In this example, since the sound output apparatus 200A and the sound output apparatus 200B are connected to the communication network NW1, the "output notice request" broadcasted by the sound acquisition apparatus 100 therefore reaches both the sound output apparatus 200A and the sound output apparatus 200B.

Here, the broadcasted "output notice request" is a message requesting each of the sound output apparatuses 200 to notify the sound acquisition apparatus 100 that the sound output apparatus 200 starts to output sound. The request also includes the "acquisition device ID" identifying the sound acquisition apparatus 100. This "acquisition device ID" may be, for example, an IP address assigned to the sound acquisition apparatus 100.

If the sound output apparatus 200 which receives the "output notice request" is outputting sounds at the time of the reception, the sound output apparatus 200 concerned transmits an "output notice" to the sender of the "output notice request" (that is, the sound acquisition apparatus 100A) in a case where the sound output apparatus 200 concerned is possible to transfer sound data (step S13). At this time, the sound output apparatus 200 refers to the "acquisition device ID" in the received "output notice request" to identify the sender of it. In this example, since the sound output apparatus 200A is outputting sound at the time when the sound acquisition apparatus 100A starts to acquire sound, the sound output apparatus 200A sends an "output notice" to the sound acquisition apparatus 100A as a reply to the "output notice request".

Here, the "output notice" is a message indicating that the sound output apparatus 200 is outputting sound, and includes an "output device ID" identifying the source of this notification. The "output device ID" may be an IP address assigned to the sound output apparatus 200 concerned (in this case, the sound output apparatus 200A).

On the other hand, the sound output apparatus 200B does not send the "output notice" even though the sound output apparatus 200B receives the broadcasted "output notice request", because the sound output apparatus 200B is not outputting sound at the time when receiving the "output notice request". However, the sound output apparatus 200B stores the received "output notice request" in its storage such as the storage unit 260. (step S14).

Upon receiving the "output notice" from the sound output apparatus 200A, the sound acquisition apparatus 100 specifies the sender of the notice (in this case, the sound output apparatus 200A) based on the "output device ID" in the notice, and sends a "transfer request" to the specified sender (step S115).

This "transfer request" is a message requesting the sound output apparatus 200 to transfer sound data representing sounds being outputted by the sound output apparatus 200 concerned (hereinafter, referred to as "output sound data") to the sound acquisition apparatus 100, and also includes "sound encoding list", "QoS (Quality of Service) request information", and the like in addition to the "acquisition device ID".

The "sound encoding list" indicates audio encoding methods the sound acquisition apparatus 100 is capable of processing and content set for each audio encoding method. The sound acquisition apparatus 100 then decodes the "output sound data" transferred from the sound output apparatus 200 in accordance with whichever sound encoding method indicated in the "sound encoding list". The "sound encoding list" includes information relating to error correction methods and encryption methods as necessary.

"QoS request information" is information indicating the quality of communication requested by the sound acquisition apparatus 100 (for example, content transfer delay time, content error rate, etc.) when the sound output apparatus 200 transfers "output sound data".

Upon receiving the "transfer request", the sound output apparatus 200A specifies the sender of the request (in this case, the sound acquisition apparatus 100A) based on the "acquisition device ID" in the request, and sends a "transfer response" to the specified sender (step S16).

This "transfer response" is information that includes, in addition to the "output device ID", "transfer availability information", "sound encoding information", "QoS information", "noise suppression information", and the like. The apparatus which receives the "transfer response" (in this case, sound acquisition apparatus 100) then saves the "sound encoding information" and "QoS information" contained in the "transfer response"

Here, "transfer availability information" indicates whether the sound output apparatus 200 concerned is possible to transfer the "output sound data" or not ("possible" or "not possible"). The sound output apparatus 200 sets "transfer availability information" to "not possible" when there is no compatibility with the sound encoding method indicated in the "sound encoding list" contained in the "transfer request" received from the sound acquisition apparatus 100, or when it is not possible to send "output sound data" in the communication quality indicated in the "QoS request information". In other cases, the transfer availability information is set to "possible".

The "sound encoding information" is information relating to the encoding of the sound data and, for example, indicates the audio encoding method for encoding the "output sound data" and setting information for each audio encoding method. The "QoS information" indicates the quality of communication (for example, guaranteed transmission delay time, guaranteed error rate, etc.) that can be ensured when the "output sound data" is transferred.

The "noise suppression information" is information used when the sound acquisition apparatus 100 suppresses the noise component from the "acquired sound data" and, for example, indicates a frequency range of sound that can be outputted by the sound output apparatus 200, the location of the sound output apparatus 200, and the like. The information relating to the "frequency range" is, for example, used to decide the frequency range of the sound subjected to noise suppression by the sound acquisition apparatus 100.

Information relating to the location is, for example, used to obtain the time required until sound emitted from the audio output unit 250 of the sound output apparatus 200 is inputted to the sound acquisition unit 120 of the sound acquisition apparatus 100. Further, for example, echo caused in the sound output signal from the sound output apparatus 200 positioned at this location can be used to determine the extent by which acquired sound data is degraded.

The sound output apparatus 200A that sent the "transfer response" then transfers the "output sound data" to the sound acquisition apparatus 100 (step S17). The "output sound data" is digital data representing sound currently being outputted by the sound output apparatus 200A concerned. In this example, sound data contained in the received television broadcasting data is transferred to the sound acquisition apparatus 100.

Then, the sound acquisition apparatus 100 executes "Noise Suppression Processing" (step S150) in order to suppress noise components (i.e. sound emitted from the sound output apparatus 200A) from sound for the telephone conversation based on the "output sound data" (in this case, sound data used for the television broadcasting) received from the sound output apparatus 200A and sound inputted to the sound acquisition apparatus 100 (in this case, sound of television broadcasting outputted by the sound output apparatus 200A). The details of this noise suppression processing will be described later.

When the sound acquisition operation of the sound acquisition apparatus 100 ends, the sound acquisition apparatus 100 broadcasts a "transfer stop request" to the communication network NW1 (step S18).

This "transfer stop request" is a message requesting each of the sound output apparatuses 200 to stop transfer of the "output sound data", and includes an "acquisition device ID".

Each of the sound output apparatuses 200 determines whether the sound output apparatus 200 itself transfers the "output sound data" at the time of receipt. The sound output apparatus 200 transferring the "output sound data" determines the transfer in response to the request. In this example, since the sound output apparatus 200A performs transfer of the "output sound data" at receipt of the "transfer stop request", the sound data transfer is therefore stopped (step S19).

On the other hand, the sound output apparatus 200B that does not carry out transfer of the "output sound data", deletes the "output notice request" stored at step S14 (step S20).

Through the above processing, if a sound output apparatus 200 on the same network outputs sound while the sound acquisition apparatus 100 performs sound acquisition operation, sound data representing the sound being outputted by the sound output apparatus 200 concerned is transferred to the sound acquisition apparatus 100. It is therefore possible to suppress noise using thus transferred sound data.

Of the operation of the noise suppression system 1, details of processing carried out at the sound acquisition apparatus 100 and the sound output apparatus 200 are now described.

Figure 5:
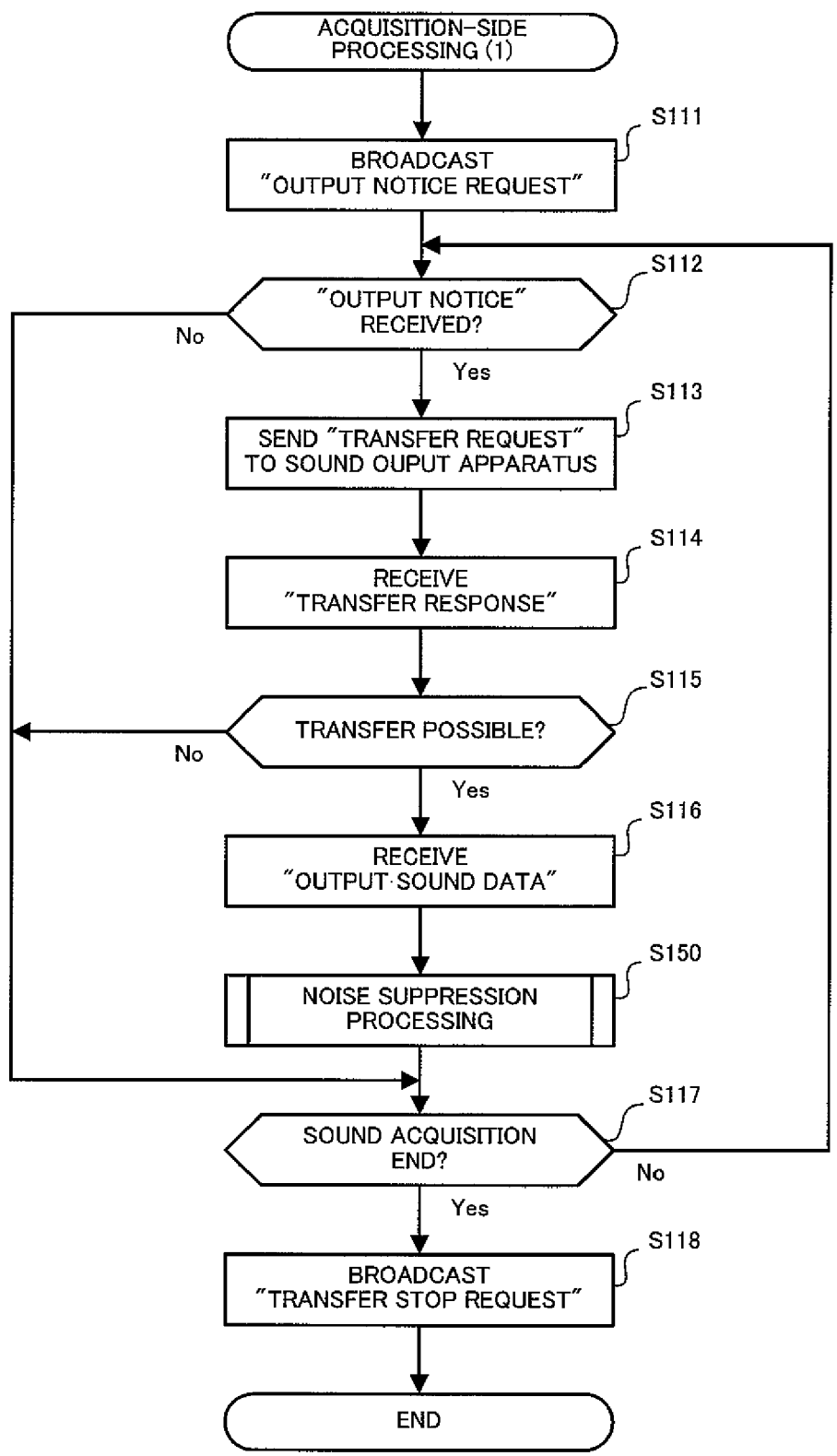
FIG. 5 is a flowchart for explaining "acquisition-side processing (1)" executed by the sound acquisition apparatus operating as shown in FIG. 4.

First, processing carried out by the sound acquisition apparatus 100 ("Acquisition-side Processing (1)") will now be described with reference to the flowchart shown in FIG. 5. This "Acquisition-side Processing (1)" starts when the sound acquisition apparatus 100 starts sound acquisition operation.

When processing starts, an "output notice request" is generated by the control unit 110 of the sound acquisition apparatus 100, and is broadcast by the communication unit 130 to the communication network NW1 (step S111).

In this embodiment, the period for the time from when the "output notice request" is broadcasted until the time when the "transfer stop request" will be broadcasted is called "sound acquiring term". That is, the "sound acquiring term" starts in response to broadcasting the "output notice request" at step S111.

When the sound acquisition apparatus 100 receives an "output notice" as response to the "output notice request" during the "sound acquiring term" (step S112: Yes), the control unit 110 generates a "transfer request" and sends it to the sound output apparatus 200 that transmitted the "output notice" (step S113).

When a "transfer response" as response to the "transfer request" is received from the sound output apparatus 200 (step S114), the control unit 110 saves the "transfer response" in the storage unit 180. Then the control unit 110 refers the "transfer availability information" in the received "transfer response" to determine whether or not it is possible for the sound output apparatus 200 to transfer the "output sound data" (step S115).

When transfer of "output sound data" by the sound output apparatus 200 is possible (step S115: Yes), "output sound data" is transferred from the sound output apparatus 200. The communication unit 130 then receives the "output sound data" (step S116) and inputs the "output sound data" to the control unit 110. Thus the sound acquisition apparatus 100 obtains the "output sound data" from the sound output apparatus 200 which represents sound being outputted by the sound output apparatus 200 concerned.

When "output sound data" is transferred from the sound output apparatus 200, the control unit 110 executes "Noise Suppression Processing" in order to suppress noise using the transferred "output sound data" (step S150).

This "Noise Suppression Processing" will now be described with reference to the flowchart shown in FIG. 6. To perform this processing, the control unit 110 executes operation programs in the storage unit 180, thus the control unit 110 functions as a time synchronization unit 111, an adaptive filter 112, an adder 113, and the like, as shown in FIG. 7.

When the processing starts, the time synchronization unit 111 refers to the "sound encoding information" and the "QoS information" contained in the saved "transfer response". The time synchronization unit 111 then estimates each transfer time required from the sound output apparatuses 200 sending each "output sound data" until each "output sound data" reaches the sound acquisition apparatus 100 (step S151).

Information indicating the guaranteed transfer delay time is contained in the "QoS information" referred to here. The guaranteed transfer delay time indicates a maximum value for delay time when the transmission of the "output sound data" is delayed. As a result, in this embodiment, the control unit 110 considers the transfer time of the "output sound data" based on this guaranteed transfer delay time. If it is possible to specify the transmission time and the receiving time for the "output sound data" from the packet header information assigned to each "output sound data", it is possible to obtain the transfer time from the difference between the receiving time and the transmission time.

The time synchronization unit 111 then synchronizes obtained "output sound data" to the estimated transfer time (step S152). In this time synchronization, for example, the acquired sound data is synchronized with respect to time with the "output sound data" by buffering for the transfer time period so as to cause a delay.

In this example, a telephone conversation starts at the sound acquisition apparatus 100A while the sound output apparatus 200A has outputted sound. The sound outputted by the sound output apparatus 200A (hereinafter, referred to as "sound A1") and the sound of speech of the user (hereinafter, referred to as "sound A2") are therefore inputted together to the sound acquisition apparatus 10A as acquired sound.

Of the acquired sounds (composite of A1+A2), the sound A1 becomes noise for the telephone conversation. The target of suppression in the noise suppression processing is therefore the sound A1. The "output sound data" as the sound source of the sound A1 (hereinafter, referred to as "sound data $D1_0$") is transferred to the sound acquisition apparatus 100 from the sound output apparatus 200. The component of the sound A1 is then suppressed from the sound data used in the telephone talk by subtracting the sound data $D1_0$ from the acquired sound data (hereinafter, referred to as "sound data $D2_0$") representing the acquired composite sounds (A1+A2).

However, the transfer takes time while "output sound data" is transferred by the sound output apparatus 200 via the communication network NW1. The sound data $D1_0$ and the sound data $D2_0$ are therefore synchronized with respect to time by delaying the sound data $D2_0$ in step S152. In the following, the acquired sound data after the time synchronization will be referred to as "sound data $D2_1$".

Here, "time synchronization" is the synchronization of the acquired sound with the sound outputted at the sound output apparatus 200. As shown in FIG. 7, the sound A1 emitted by the audio output unit 250 of the sound output apparatus 200 propagates through space, then reaches the sound acquisition unit 120 of the sound acquisition apparatus 100. This means that in order to appropriately suppress the sound A1, it is necessary to take into consideration the propagation time from output at the sound output unit 250 to reaching the sound acquisition unit 120.

It is therefore necessary to further delay the time for spatial propagation of the sound data $D1_0$. In this embodiment, the sound data $D1_0$ is inputted to the adaptive filter 112. The propagation delay of the sound outputted from the sound output apparatus 200 is then estimated (step S153).

Here, the adaptive filter 112 is taken to be an adaptive filter based on a "transfer function h" including the influence of delays (spatial transfer delay characteristic) in timing occurring due to the sound A1 propagating a spatial propagation path (hereinafter, referred to as "transmission path EPp"), It is then possible to estimate the delay due to convolution of the transmission path EP using convolution of the sound data $D1_0$ by the adaptive filter. The "output sound data" after the propagation delay is estimated by the adaptive filter 112 will be referred to as "sound data $D1_1$" in the following.

In this event, the adaptive filter 112 decides a filter coefficient (tap coefficient) for the estimated impulse response of the transmission path EP, for example, every time the sound data $D1_0$ is sampled, and saves the filter coefficient in the storage unit 180. The algorithm for deciding the filter coefficient is arbitrary. For example, if the adaptive filter may include an FIR (Finite Impulse Response) filter, an NLMS Normalized Least Mean Square) algorithm can be used.

Further, the adaptive filter 112 learns so that the transfer characteristics of the adaptive filter gradually approach the as-yet unknown transfer function (distortion characteristic resulting from transmission of the sound A1 on the transmission path EP) every time the filter coefficient is decided. The speed of this learning may be controlled by changing the step size.

Here, the location of the sound output apparatus 200 can be specified by referring to the "noise suppression information" contained in the "transfer response" so as to obtain the distance between the sound output unit 250 and the sound acquisition unit 120. In this case, it is possible to further increase the precision of estimating the delay due to the spatial transmission by optimizing the adaptive filter based on the obtained distance.

The sound data $D1_1$ (output sound data) processed by the adaptive filter 112 and the sound data $D2_1$ (acquired sound data) used in time synchronization at the time synchronization unit 111 are inputted to the adder 113.

The adder 113 then generates sound data (sound data D3) with the component of the sound A1 that constitutes noise suppressed from the acquired sound by subtracting the sound data $D1_1$ generated by the adaptive filter 112 from the sound data $D2_1$ that is the time-synchronized acquired sound data (step S154). The sound data D3 is then utilized in processing corresponding to the sound acquisition operation in the sound acquisition apparatus 100 (step S155). In this example, speech sound is acquired in the telephone call that the user makes at the sound acquisition apparatus 100A (mobile phone). The control unit 110 then sends the acquired sound data after noise suppression to the called party by the communication unit 130.

Such noise suppression using the transferred "output sound data" is continuously carried out until an end event for the noise suppression processing occurs (step S156: No).

When the sound acquisition operation in the sound acquisition apparatus 100 comes to an end, the target of noise suppression also ceases to exist. It is considered that the end event for the noise suppression processing occurs (step S156: Yes). In this case, the control unit 110 terminates the noise suppression processing, and the process flow returns to the "Acquisition-side Processing (1)" (FIG. 5).

In the "Acquisition-side Processing (1)" (FIG. 5), if it is determined that the sound acquisition operation ends (step S117: Yes), the control unit 110 generates a "transfer stop request". The "transfer stop request" is then broadcasted from the communication unit 130 to the communication network NW1 (step S118), and the control unit 110 terminates the processing. The "sound acquiring term" then ends as a result of broadcasting the "transfer stop request". Namely, at each sound output apparatus 200, it is possible to recognize that the "sound acquiring term" has finished by receiving the "transfer stop request" from the sound acquisition apparatus 100.

In the "Acquisition-side Processing (1)", if the "output notice" is not received during the "sound acquiring term" (step S112: No) or if "transfer availability information" indicates "transfer not possible" (step S115: No), the "Noise Suppression Processing" is not carried out. In this case, a "transfer stop request" is broadcast in accordance with end of the sound acquisition operation (step S117: Yes, step S118), then the processing ends.

Figure 8:
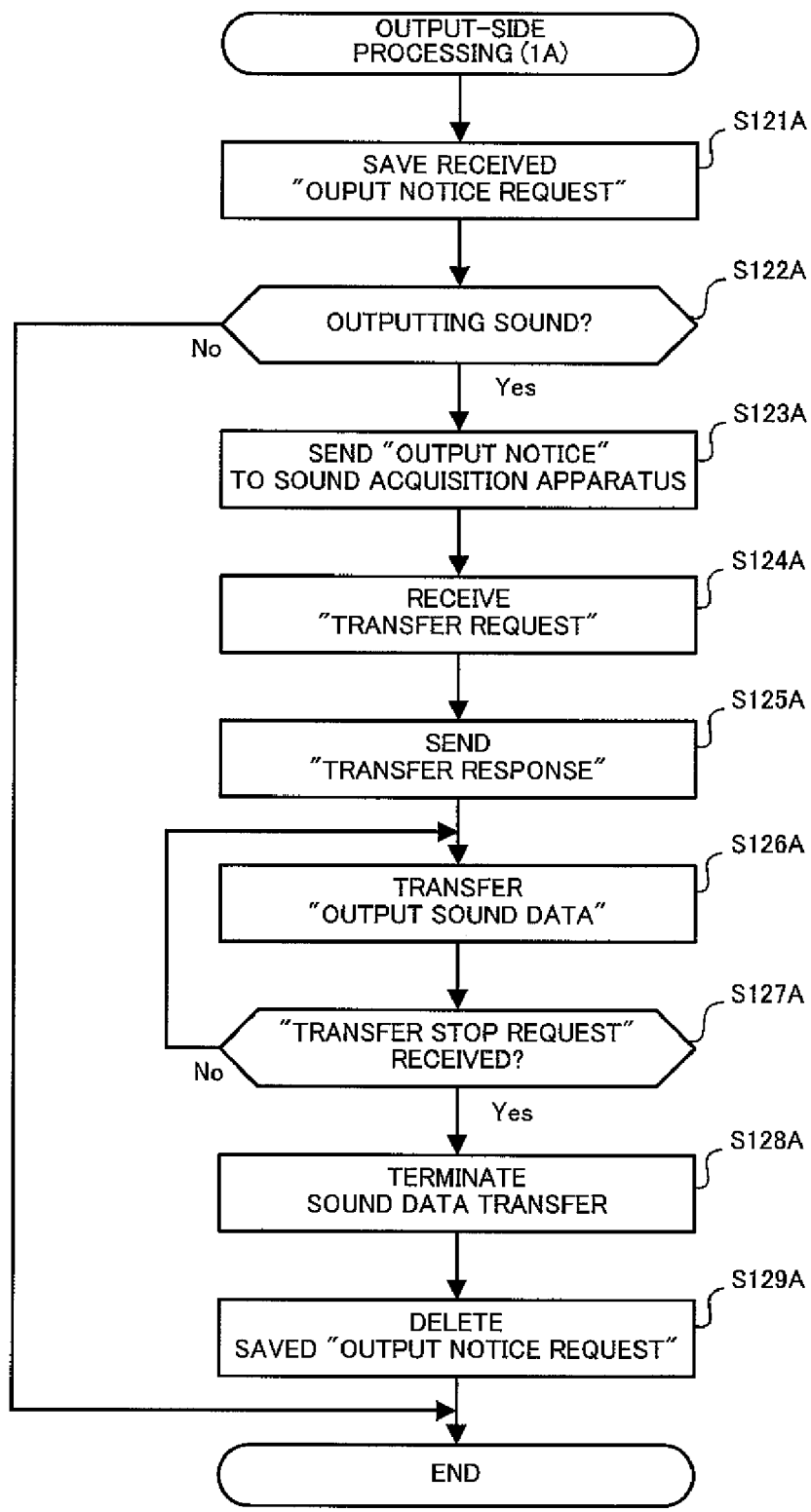
FIG. 8 is a flowchart for explaining "output side processing (1A)" executed by a sound output apparatus operating as shown in FIG. 4.

Next, a description is given of the operation of the sound output apparatus 200 for processing shown in the sequence chart of FIG. 4. First, processing ("Output-side Processing (1A)") executed by the sound output apparatus 200A that outputs sound during the sound acquisition by the sound acquisition apparatus 100 will now be described with reference to the flowchart shown in FIG. 8. This "Output-side Processing (1A)" starts when the sound output apparatus 200A receives an "output notice request" broadcasted by the sound acquisition apparatus 100.

When the processing starts, the control unit 210 of the sound output apparatus 200 (=sound output apparatus 200A) saves the received "output notice request" in the storage unit 260 (step S121A).

The sound output apparatus 200A of this example outputs sound at the time of receiving an "output notice request" (step S122A: Yes). The control unit 210 then generates an "output notice" to be sent to the sound acquisition apparatus 100 which is a sender of the received "output notice request" (step S123A).

If the sound output operation is not carried out at the sound output apparatus 200 (step S122A: No), the control unit 210 of the sound output apparatus 200 concerned terminates this processing.

When an "output notice" is sent in step S123A, the sound output apparatus 200A receives a "transfer request" as response to the "output notice" sent from the sound acquisition apparatus 100 (step S124A). In this case, the control unit 210 generates a "transfer response" and sends it to the sound acquisition apparatus 100 (step S125A), then starts to transfer the sound data representing currently outputted sound ("output sound data") to the sound acquisition apparatus 100 (step S126A).

In this example, the sound output apparatus 200A outputs sounds of the received television broadcasting. The control unit 210 then transfers the sound data in the television broadcasting received by the broadcasting receiver 230 to the sound acquisition apparatus 100.

This transfer operation is continued until a "transfer stop request" is received from the sound acquisition apparatus 100 (step S127A: No).

When the "transfer stop request" is received from the sound acquisition apparatus 100 (step S127A: Yes), the control unit 210 stops the transfer of "output sound data" to the sound acquisition apparatus 100 (step S128A). Then the control unit 210 deletes "output notice request" saved in the storage unit 260 at step S121A (step S129A), and the processing is terminated.

This means that the "output notice request" broadcasted from the sound acquisition apparatus 100 is saved until the "transfer stop request" is received from the sound acquisition apparatus 100 which is a sender of the "output notice request". It is then possible for the sound output apparatus 200 to understand the "sound acquiring term" of the sound acquisition apparatus 100 with referring the presence or absence of the "output notice request".

When there are pluralities of sound acquisition apparatuses 100 on the communication network NW1, "sound acquiring terms" are raised for the respective sound acquisition units 100, and each of the sound output units 200 recognize the terms respectively. If sound is outputted within any one of the "sound acquiring terms", "output sound data" is then transferred to the corresponding sound acquisition apparatus 100.

Figure 9:
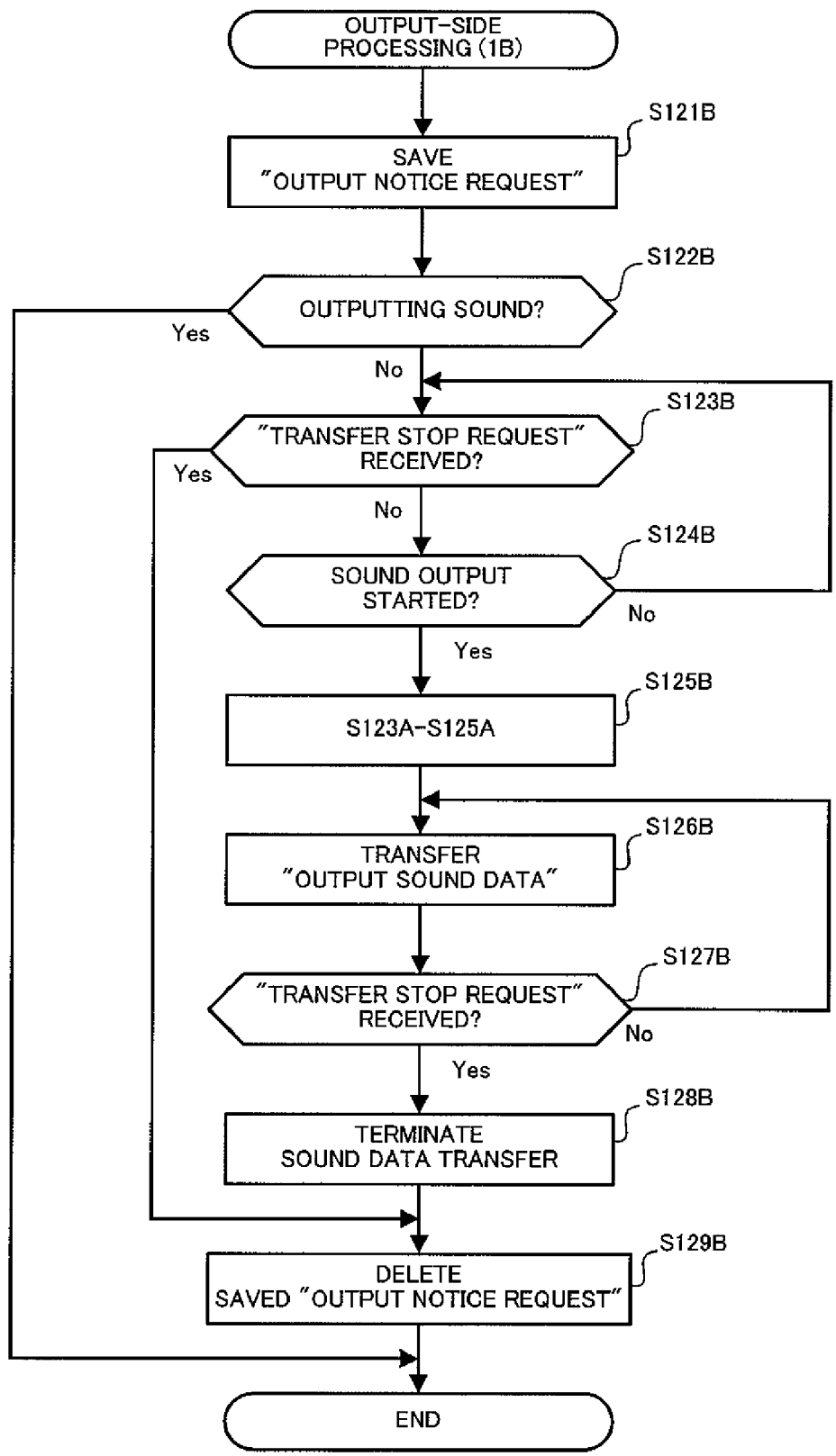
FIG. 9 is a flowchart for explaining the "output side processing (1B)" executed by a sound output apparatus operating as shown in FIG. 4.

Next, in the operation example shown in FIG. 4, processing ("Output-side Processing (1B)") carried out by the sound output apparatus 200B that has not outputted sound during broadcasting of the "output notice request" by the sound acquisition apparatus 100 will now be described with reference to the flowchart shown in FIG. 9. The "Output-side Processing (1B)" also starts upon the sound output apparatus 200 (=sound output apparatus 200B) receiving the "output notice request".

When the processing starts, the control unit 210 of the sound output apparatus 200 (=sound output apparatus 200B) saves the received "output notice request" in the storage unit 260 (step S121B). The "sound acquiring term" can then be recognized by saving the "output notice request".

The sound output apparatus 200B of this example does not output sound at the time of receiving the "output notice request" (Step S122B: No). Generation and transmission of the "output notice" is then not carried out.

On the other hand, if sound output operation is carried out at the sound output apparatus 200 (step S122B: Yes), this processing is terminated. In this case, the "Output-side Processing 1(A)" (FIG. 8) described above is carried out.

If the sound output apparatus 200B that is not outputting sound at the time of receiving the "output notice request" receives the "transfer stop request" from the sound acquisition apparatus 100 before starting a sound output operation (step S123B: No, step S124B: No, step S123B: Yes), in other words, if a sound output operation is not started within the "sound acquiring term" of the sound acquisition apparatus 100 (=sound acquisition apparatus 100A) which is the sender of the "output notice request" stored in the sound output apparatus 200B, the control unit 210 of the sound output apparatus 200B deletes the saved "output notice request" (step S129B), and terminates the processing.

On the other hand, if the sound output apparatus 200 (=sound output apparatus 200B) starts to output sound before receiving an "transfer stop request" from the sound acquisition apparatus 100 (step S123B: No, step S124B: Yes), in other words, if the sound output operation starts within the "sound acquiring term" of the sound acquisition apparatus 100 (=sound acquisition apparatus 100A) which is the sender of the "output notice request" stored in the sound output apparatus 200B, the control unit 210 carries out the same operation as in step S123A to step 8125A in the "Output-side Processing (1A)" (FIG. 8), i.e. transmission of an "output notice" to the sound acquisition apparatus 100 (step S123A), receipt of a "transfer request" from the sound acquisition apparatus 100 (step S124A), and transmission of a "transfer request" to the sound acquisition apparatus 100 (step S125A) are carried out (step S125B).

In this event, the control unit 210 starts transfer of the "output sound data" to the sound acquisition apparatus 100 (step S126B). The sound output apparatus 200B of this example is an audio player. The sound data that gives the sound source of the outputted sound is then transferred to the sound acquisition apparatus 100. This transfer operation is continued until the sound output apparatus 200B receives a "transfer stop request" from the sound acquisition apparatus 100 (step S127B: No).

When the sound output apparatus 200B receives the "transfer stop request" from the sound acquisition apparatus 100 (step S127B: Yes), the control unit 210 stops the sound data transfer operation (step S128B). Then, the control unit 210 deletes the "output notice request" saved in step S121B (step S129B), and terminates the processing.

In this way, if the outputting of sound is started during the "sound acquiring term" of the sound acquisition apparatus 100, even if the sound output apparatus 200 was not outputting sound at the time when the sound acquisition apparatus 100 started its sound acquisition, the sound data is transferred to the sound acquisition apparatus 100. It is then possible to carry out noise suppression processing at the sound acquisition apparatus 100.

As described above, according to this embodiment, when the sound acquisition apparatus 100 starts the sound acquisition operation, the "sound acquiring term" commences. If the sound output apparatus 200 that carries out the sound output operation within this period, sound data representing sound being outputted by the sound output apparatus 200 is transferred to the sound acquisition apparatus 100. It is then possible to carry out noise suppression by the sound acquisition apparatus 100 during its sound acquisition operation.

In this event, sound data transfer through the communication network NW1 does not occur unless the sound acquisition apparatus 100 starts its sound acquisition operation. As a result, effective noise suppression is realized with the least traffic load on the communication network NW1.

Operation is therefore such that the respective "sound acquiring terms" for each of the sound acquisition apparatuses 100 can be recognized by each sound output apparatus 200. This means that it is possible to reliably suppress noise even if a plurality of sound acquisition apparatuses 100 start to acquire sound or if a plurality of sound output apparatuses 200 start to output sound.

When a plurality of sound output apparatuses 200 output sound within the "sound acquiring term" of a certain sound acquisition apparatus 100, plural sets of "output sound data" are transferred to the sound acquisition apparatus 100 from each of the sound output apparatuses 200. In this case, time synchronization performed in the "Noise Suppression Processing" (FIG. 6) by the time synchronization unit 111 of the sound acquisition apparatus 100 finds out target "output sound data" showing the longest transfer time (that is, the most delayed one in the transferred "output sound data"), and synchronizes the acquired sound data and other "output sound data" with the target "output sound data". It is therefore possible to reliably suppress noise even in cases where a plurality of sounds is being outputted.

Second Embodiment

In the first embodiment, each of the sound output apparatuses 200 transfers "output sound data" in accordance with "sound acquiring terms" based on the sound acquisition operation of the sound acquisition apparatus 100. However, when the number of sound acquisition apparatuses 100 is large, the processing load on each of the sound output apparatuses 200 also becomes large. It is therefore also possible for the sound acquisition apparatus 100 to operate based on a period where each of the sound output apparatuses 200 outputs sound (hereinafter, "sound outputting term").

Figure 10:
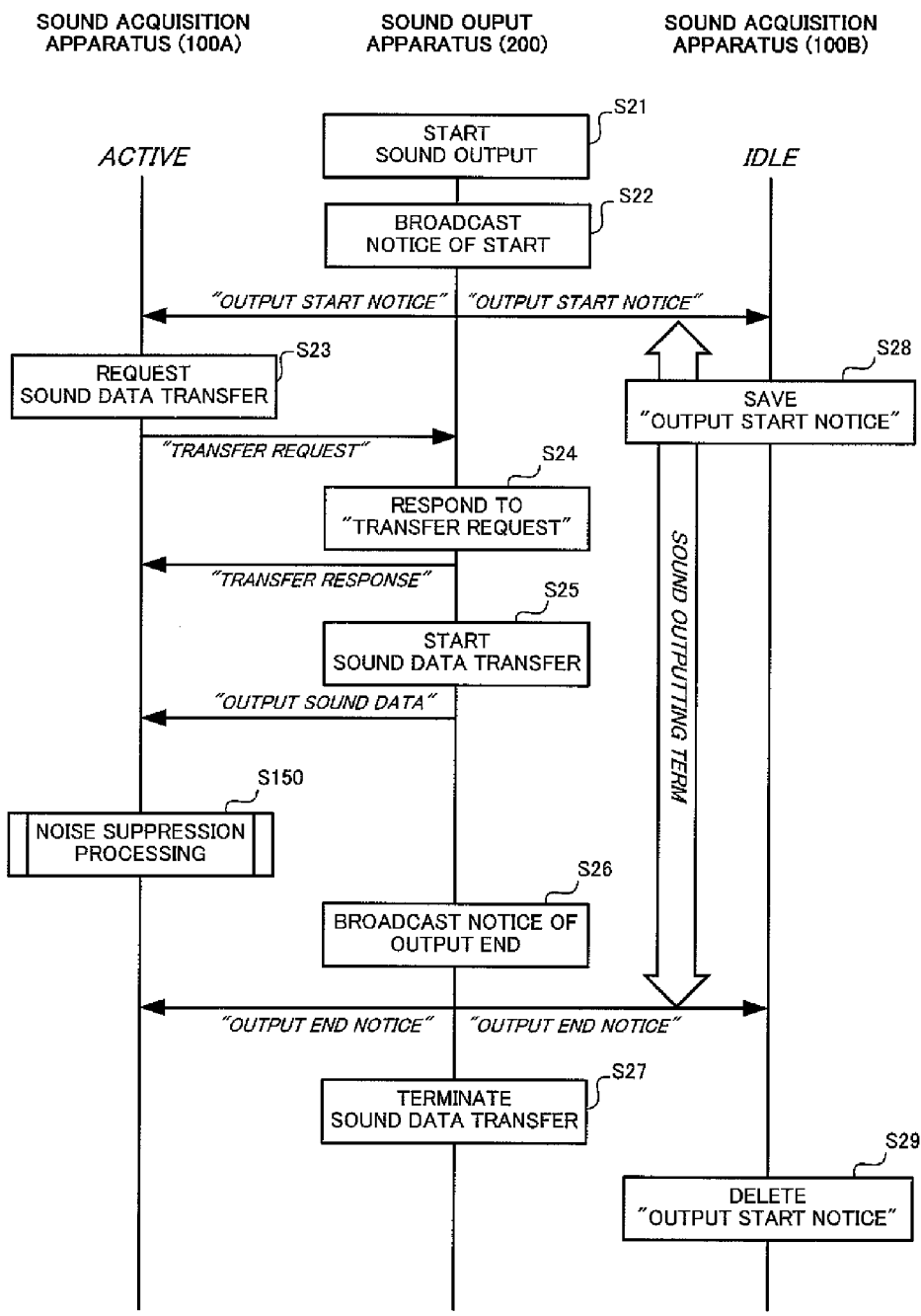
FIG. 10 is a sequence chart for explaining the operation of a second embodiment of the present invention.

The operation of the noise suppression system 1 in this case is outlined with reference to the sequence chart shown in FIG. 10.

In this embodiment, it is assumed that of the configuration of the noise suppression system 1 shown in FIG. 1, the sound acquisition apparatus 100A (mobile phone) and the sound acquisition apparatus 100B (PC), and any of the sound output apparatuses 200 are active, and that the sound acquisition apparatus 100A has carried out its sound acquiring operation (active) at the time where the sound output apparatus 200 starts the sound output operation, while the sound acquisition apparatus 100B does not carry out its sound acquiring operation (idle).

In this case, when the sound output apparatus 200 starts to output sound (step S21), the control unit 210 generates an "output start notice" that gives notification of the start of the sound output operation, and broadcasts it to the communication network NW1 through the communication unit 220 (step S22). The "output start notice" includes an "output device ID" for specifying the sound output apparatus 200.

Each sound acquisition apparatus 100 then receives the "output start notice" broadcasted by the sound output apparatus 200. The sound acquisition apparatus 100 that carries out the sound acquisition operation (i.e. the sound acquisition apparatus 100A) makes a request to the sound output apparatus 200 for the transfer of "output sound data" to be used for the noise suppression because the sound outputted by the sound output apparatus 200 constitutes the noise in the sound acquisition operation currently being carried out (step S23).

Thereafter, as with the operation in the first embodiment described above, after the sound output apparatus 200 sends a "transfer response" in response to the "transfer request" from the sound acquisition apparatus 100A (step S24), and starts to transfer the "output sound data" to the sound acquisition apparatus 100A (step S25).

The sound acquisition apparatus 100A then executes "Noise Suppression Processing" using the "output sound data" transferred from the sound output apparatus 200 (step S150). This "Noise Suppression Processing" is the same as the processing shown in FIG. 6.

When the sound output operation of the sound output apparatus 200 ends, the sound output apparatus 200 broadcasts an "output end notice" indicating that the sound output operation has ended (step S26). Transfer of the "output sound data" then ends (step S27). In this event, since the sound acquisition apparatus 100A no longer obtains "output sound data" to be used in the noise suppression processing, the noise suppression processing at the sound acquisition apparatus 100A is also terminated in accordance with the end of the sound data transfer.

On the other hand, at the sound acquisition apparatus 100B that is not acquiring sound, an "output start notice" received from the sound output apparatus 200 is saved in the storage unit 180 (step S28). The saved "output start notice" will be deleted as a result of the receipt of the "output end notice" (step S29).

In this embodiment, the period from a point where the sound output apparatus 200 broadcasts the "output start notice" to a point where the sound output apparatus 200 broadcasts the "output end notice" is taken to be the "sound outputting term" of the sound output apparatus 200.

If the sound acquisition apparatus 100 carries out its sound acquisition operation during "sound outputting term" is being recognized, the sound acquisition apparatus 100 requests the sound output apparatus 200 corresponding to the recognized "sound output term" to transfer the "output sound data", then carries out the noise suppression using the transferred sound data.

Figure 11:
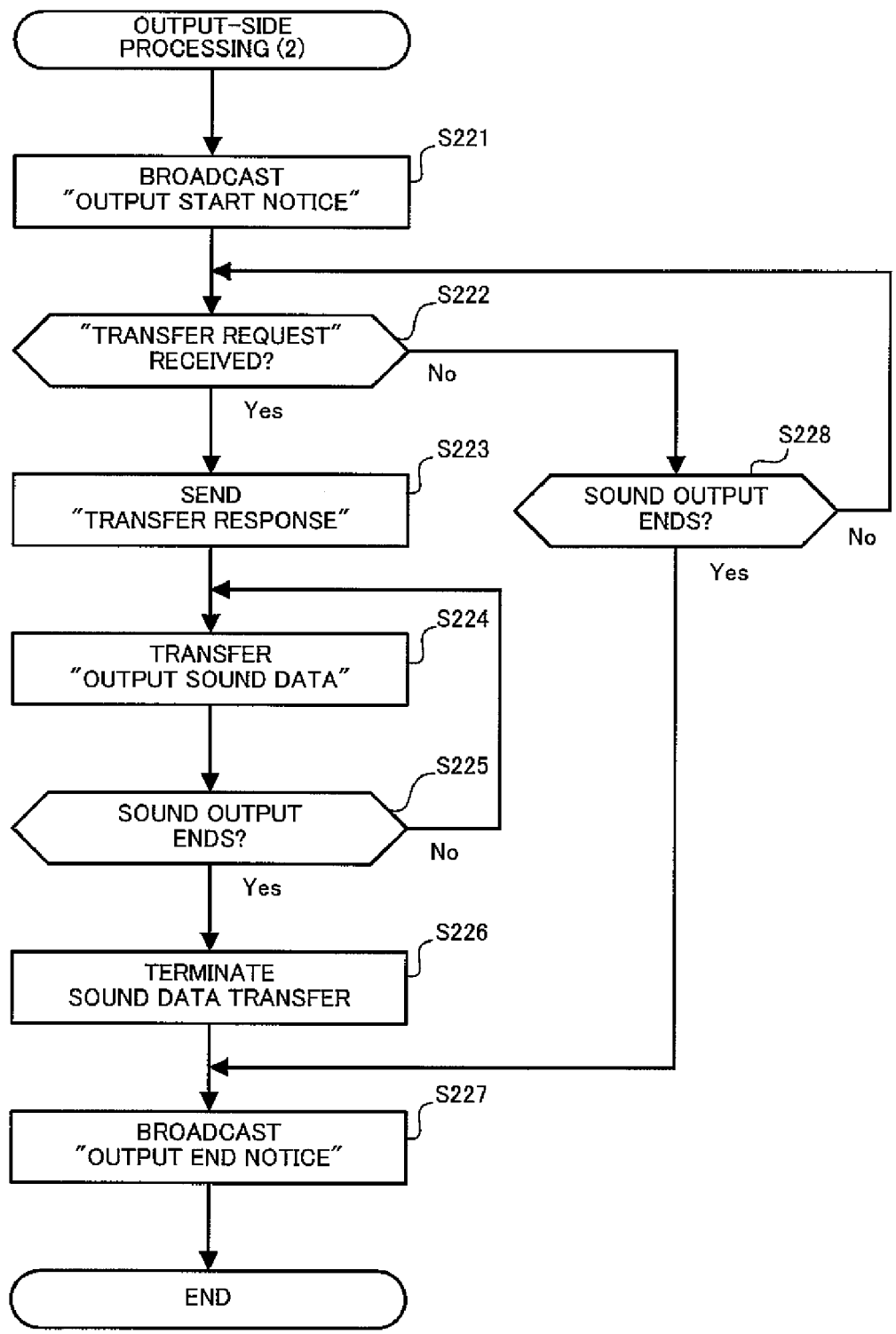
FIG. 11 is a flowchart for explaining the "output side processing (2)" executed by a sound output apparatus operating as shown in FIG. 10.

A description is now given of the processing at each apparatus in the operation of the noise suppression system 1. First, processing carried out by the sound output apparatus 200 ("Output-side Processing (2)") will now be described with reference to the flowchart shown in FIG. 11. This "Output-side Processing (2)" starts when the sound output apparatus 200 starts to output sound.

When the processing starts, the control unit 210 of the sound output apparatus 200 generates an "output start notice", and broadcasts it to the communication network NW1 through the communication unit 220 (step S221).

When the "transfer request" is received from the sound acquisition apparatus 100 as a response to the "output start notice" (step S222: Yes), the control unit 210 generates a "transfer response" and sends it to the sound acquisition apparatus 100 (step S223). The control unit 210 then starts to transfer the "output sound data" to the sound acquisition apparatus 100 (step S224).

Such transfer operation is carried out until the sound output operation at the sound output apparatus 200 ends (step S225: No).

When the sound output operation at the sound output apparatus 200 ends (step S225: Yes), the control unit 210 also terminates the transfer of the "output sound data" (step S226). Then, the control unit 210 broadcasts an "output end notice" to the communication network NW1 (step S227), and terminates the processing.

Here, the period of time from the "output start notice" being broadcasted in step S221 to the broadcasting of the "output end notice" in step S227 is the "sound outputting term" for the sound output apparatus 200. If a "transfer request" is not received during this term (step S222: No, step S228: Yes), the control unit 210 broadcasts an "output end notice" without transferring "output sound data" (step S227), and terminates the processing.

Next, a description is given of processing of the sound acquisition apparatus 100 in this embodiment. First, the processing carried out by the sound acquisition apparatus 100A that carries out sound acquisition operation when the sound output apparatus 200 starts to output sound ("Acquisition-side Processing (2A)") will now be described with reference to the flowchart shown in FIG. 12. This "Acquisition-side Processing (2A)" starts when the sound acquisition apparatus 100 receives an "output start notice" broadcasted by the sound output apparatus 200.

When the processing starts, the control unit 110 of the sound acquisition apparatus 100 saves the received "output start notice" in the storage unit 180 (step S211A).

The sound acquisition apparatus 100A of this example is carrying out the sound acquiring operation at this time (step S212A: Yes). The control unit 110 then generates a "transfer request" and sends it to the sender of the saved "output start notice" based on the "output device ID" in it (step S213A).

When a "transfer response" to the received "transfer request" is received from the sound output apparatus 200 (step S214A), the control unit 110 determines whether or not it is possible for the sound output apparatus 200 to transfer the "output sound data" based on the "transfer availability information" in the received "transfer response" (step S215A).

If it is determined that the sound data transfer is not possible (step S215A: No), the control unit 110 terminates the processing because it is not possible to perform noise suppression without "output sound data".

On the other hand, if transfer is possible (step S215A: Yes), the sound acquisition apparatus 100 receives the "output sound data" transferred from the sound output apparatus 200 (step S216A). Noise suppression processing is then executed using the transferred "output sound data" (step S150).

Figure 6:
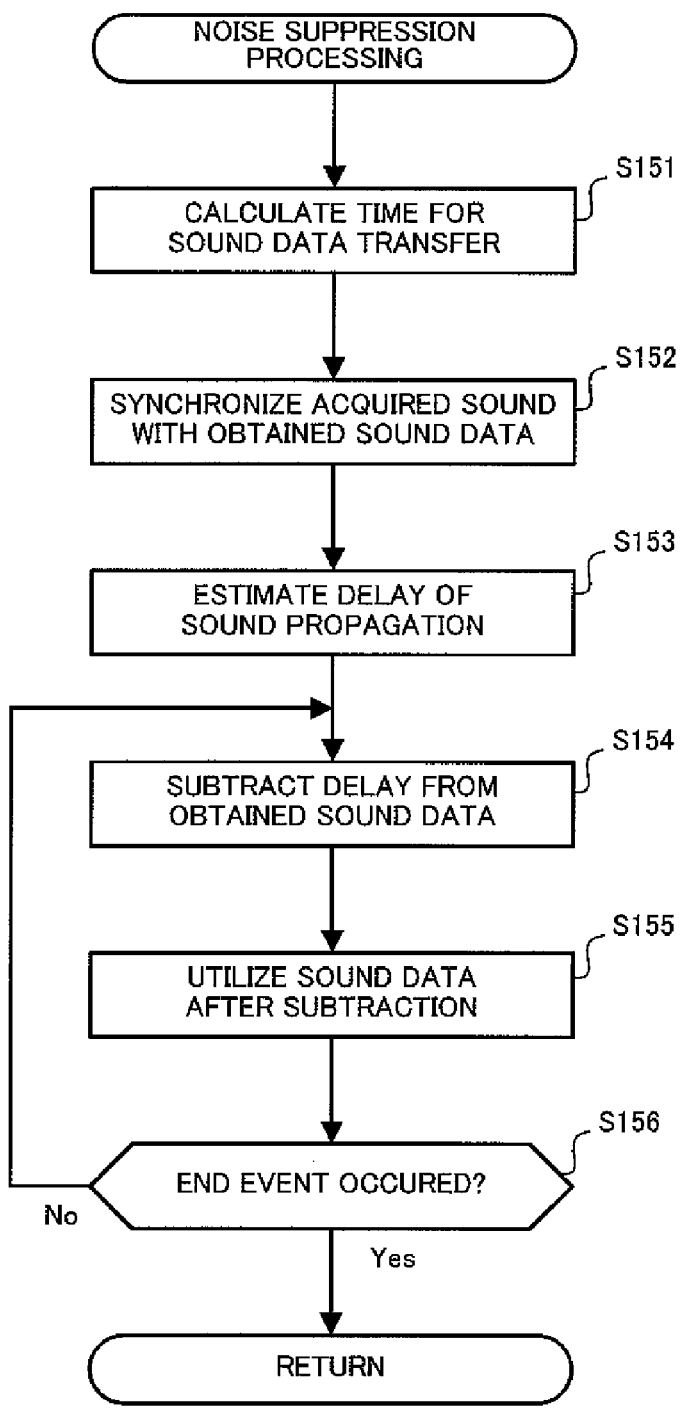
FIG. 6 is a flowchart for explaining "noise elimination processing" of the embodiments of the present invention.
Figure 7:
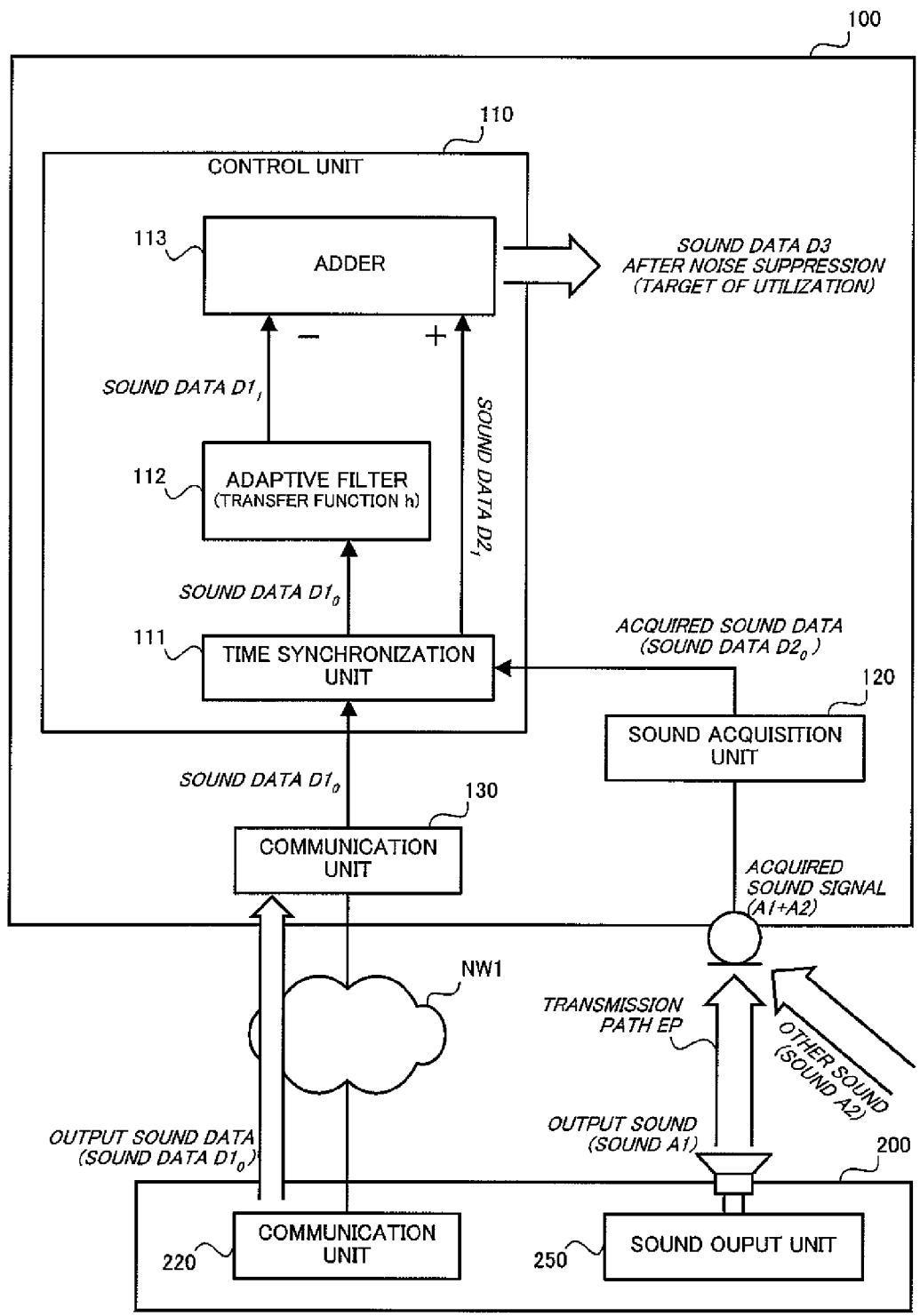
FIG. 7 is a block diagram illustrating the operation when the "noise elimination processing" shown in FIG. 6 is executed.

The noise suppression processing executed here is the same as the processing shown in FIG. 6 but the reception of the "output end notice" sent by the sound output apparatus 200 is taken to be an end event for the noise suppression processing.

In this case, the "Noise Suppression Processing" ends as a result of receiving the "output end notice". The control unit 110 then deletes the "output start notice" saved in step S211A (step S217A), and terminates the processing.

Namely, the sound acquisition apparatus 100 carrying out its sound acquisition operation when the sound output apparatus 200 starts sound output operation, requests the sound output apparatus 200 to transfer the "output sound data". Noise suppression is then carried out using the transferred "output sound data". The operation of suppressing noise then ends together with the sound output apparatus 200 ending the outputting of sound.

Figure 13:
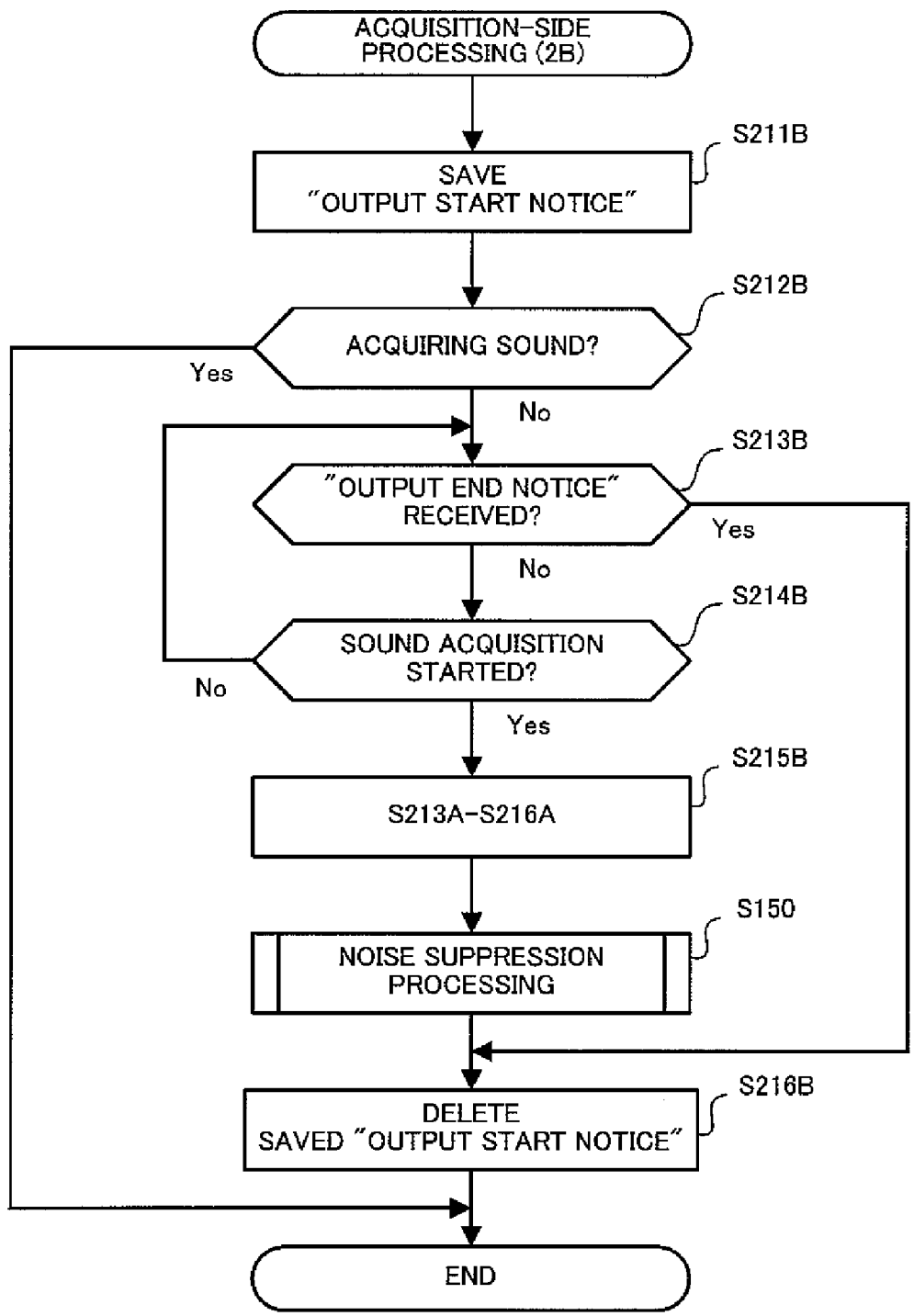
FIG. 13 is a flowchart for explaining "acquisition-side processing (2B)" executed by the sound acquisition apparatus operating as shown in FIG. 10.

Next, the processing to be carried out by the sound acquisition apparatus 100 (=sound acquisition apparatus 100B) that does not carry out sound acquisition operation at the time when the sound output apparatus 200 starts to output sound ("Acquisition-side Processing (2B)") will now be described with reference to the flowchart shown in FIG. 13. This "Acquisition-side Processing (2B)" starts when the sound acquisition apparatus 100 receives the "output start notice" broadcasted by the sound output apparatus 200.

When the processing starts, the control unit 110 of the sound acquisition apparatus 100B saves the received "output start notice" in the storage unit 180 (step S211B).

In this example, since the sound acquisition apparatus 100B is not carrying out its sound acquiring operation at this time (step S212B: No), the sound acquisition apparatus 100B does not send a "transfer request".

If the sound acquisition apparatus 100 does not start sound acquisition operation during the "sound outputting term" of the sound output apparatus 200 that sent the "output start notice" saved in step S211B (step S213B: No, step S214B: No, step S213B: Yes), the saved "output start notice" is deleted (step S216B) and the processing ends.

Figure 12:
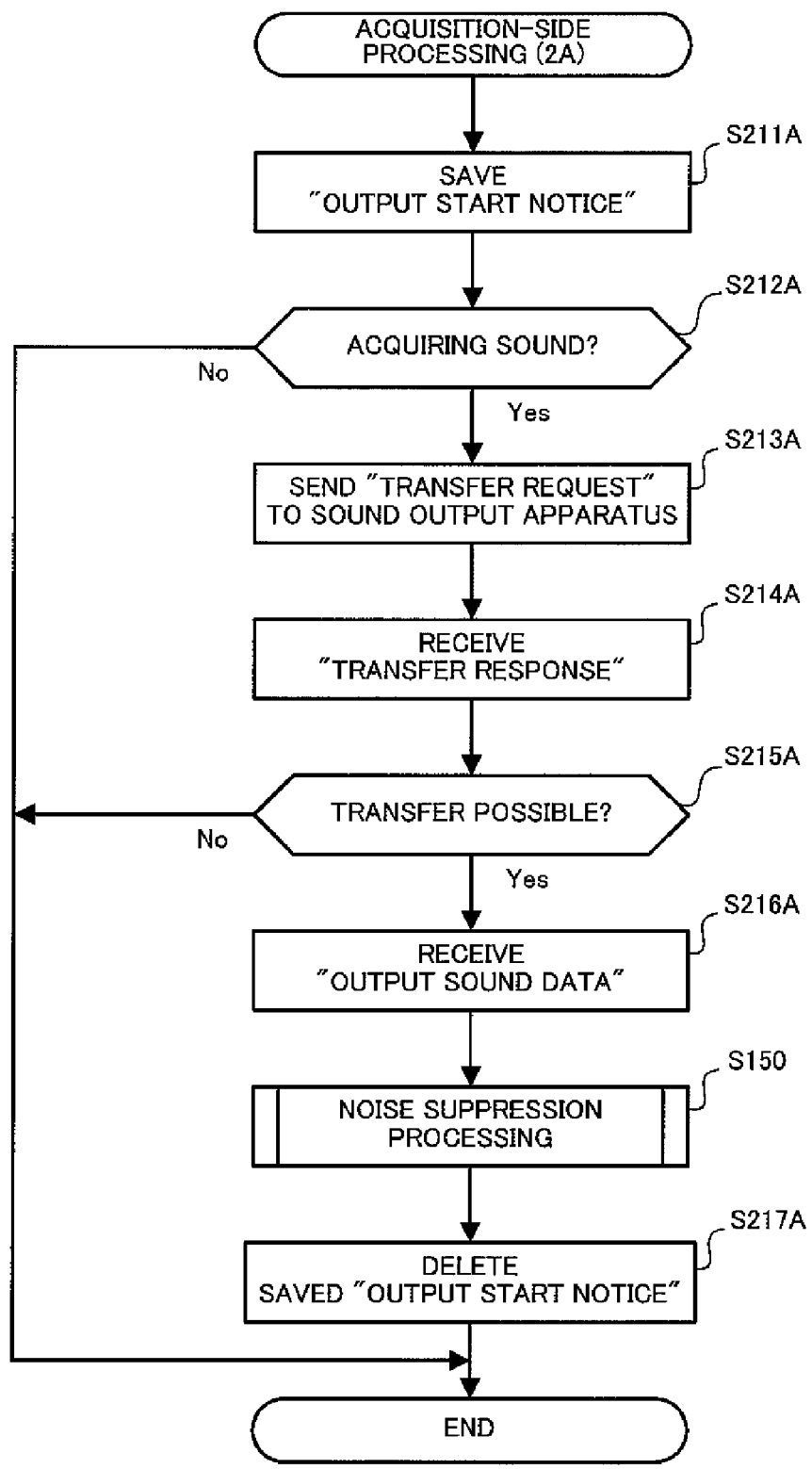
FIG. 12 is a flowchart for explaining "acquisition-side processing (2A)" executed by the sound acquisition apparatus operating as shown in FIG. 10.

On the other hand, when the sound acquisition apparatus 100 starts its sound acquisition operation within the "sound outputting term" of the sound output apparatus 200 which is the sender of the saved "output start notice" (step S214B: Yes), the control unit 110 carries out the same processing as in step S213A to step S216A in the "Acquisition-side Processing (2A)" (FIG. 12). Namely, transmission of a "transfer request" to the sound output apparatus 200 (step S213A), reception of a "transfer response" from the sound output apparatus 200 (step S214A), and reception of the "output sound data" transferred (step S215A: Yes, step S216A) are carried out (step S215B).

In this event, "Noise Suppression Processing" is executed using the transferred "output sound data" (step S150). This "Noise Suppression Processing" then ends taking the receipt of an "output end notice" from the sound output apparatus 200 as the end event.

When the "Noise Suppression Processing" ends as a result of receiving the "output end notice", the control unit 110 then deletes the "output start notice" saved in step S211B (step S216B), and terminates the processing.

In this way, if the acquisition of sound is started during the "sound outputting term" of the sound output apparatus 200 even for the sound acquisition apparatus 100 that is not acquiring sound at the time when the sound output apparatus 200 starts sound output, the sound data giving this sound source is transferred from the sound output apparatus 200. It is then possible to carry out processmg to suppress the sound at the sound acquisition apparatus 100.

As described above, according to this embodiment, when the sound output apparatus 200 starts the sound output operation, the "sound outputting term" commences. The sound acquisition apparatus 100 that carries out the sound acquisition operation within this term then receives the "output sound data". It is then possible to carry out the noise suppression during the sound acquisition operation by the sound acquisition apparatus 100.

Operation is therefore such that the respective "sound outputting term" for each of the sound output apparatuses 200 can be recognized by each sound acquisition apparatus 100. This means that it is possible to effectively suppress noise even if a plurality of sound acquisition apparatuses 100 start to acquire sound or if a plurality of sound output apparatuses 200 start to output sound.

Further, since each of the sound output apparatuses 200 transfers "output sound data" according to its own sound output operation, the operational loads on the sound output apparatuses 200 are reduced rather than the case exemplified in the first embodiment where sound data transfer takes place according to the sound acquisition operation of the sound acquisition apparatus 100. Further, implementation in the sound output apparatus 200 is straightforward.

Third Embodiment

In the first and second embodiments, noise suppression is carried out with using the "output sound data" transferred by the sound output apparatus 200. However, it is also possible to suppress noise by obtaining "output sound data" from elsewhere other than the sound output apparatus 200.

For example, when the sound output apparatus 200 outputs sounds of television or radio broadcasting, or outputs sounds for audio contents distributed via the communication network NW2 such as the Internet, the sound acquisition apparatus 100 may obtain sound data directly by receiving the television or radio broadeastings or by downloading the contents data as the "output sound data".

Figure 14:
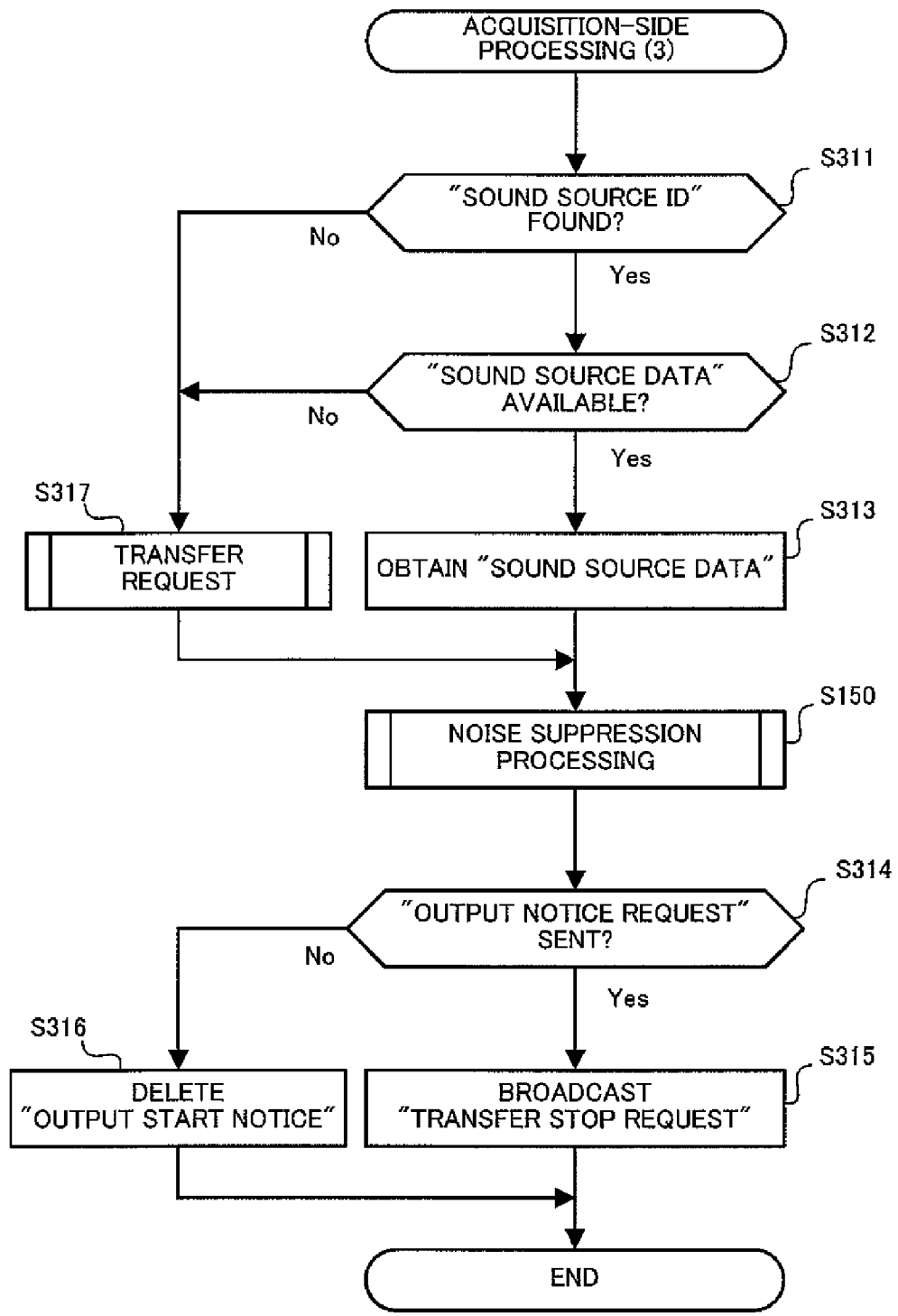
FIG. 14 is a flowchart for explaining the operation of a sound acquisition apparatus of a third embodiment of the present invention.

The processing "Acquisition-side Processing (3)" carried out by the sound acquisition apparatus 100 in this case is now described with reference to the flowchart shown in FIG. 14. This "Acquisition-side Processing (3)" starts when the sound acquisition apparatus 100 receives an "output notice" or an "output start notice" from the sound output apparatus 200. Namely, in case of the operation exemplified in the first embodiment, the processing starts in response to the receipt of an "output notice" from the sound output apparatus 200 when the noise suppression operation is carried out upon the sound acquisition apparatus 100 starting to acquire sound. Or, in case of the operation exemplified in the second embodiment, the processing starts in response to the receipt of an "output start notice" from the sound output apparatus 200 when the noise suppression operation is carried out upon the sound output apparatus 200 starting to output sound.

The sound acquisition apparatus 100 of this example assumes a mobile phone (i.e. sound acquisition apparatus 100A) capable of receiving television broadcasting such as one segment broadcasting and assumes the case where the sound output apparatus 200 is a television receiver (i.e. the sound output apparatus 200A) capable of receiving television broadcasting.

When processing starts, the control unit 110 determines whether or not a "sound source ID" is included in the received "output notice" or "output start notice" (step S311).

In this embodiment, when sound source data for sound outputted by the sound output apparatus 200 can be obtained in the same way even for apparatuses other than the sound output apparatus 200, the sound output apparatus 200 includes a "sound source ID" identifying the sound source, in the "output notice" or "output start notice" to be transmitted.

This "sound source ID" is information indicating, for example, the channel or frequency band of the program being received or IP address (multi-cast address) indicating a host of the audio contents being received, contents information for specifying a program or contents having sound to be reproduced, or the like.

If there is no information common between the sound output apparatus 200 and the sound acquisition apparatus 100 that can be taken as information specifying the source of the "output sound data", the "source ID" may be set as "none", When a "source ID" is set to the received information (step S311: Yes), the control unit 110 determines whether or not the sound acquisition apparatus 100 is capable of obtaining sound data (hereinafter, referred to as "sound source data") from the sound source indicated by the sound source ID (step S312).

For example, when the sound source indicated by the sound source ID is a television or radio program being broadcasted, the control unit 110 determines whether or not it is possible for the sound acquisition apparatus 100 to receive the television/radio broadcasting concerned.

In this example, the sound output apparatus 200 is a television receiver. The "sound source ID" issued by the sound output apparatus 200 indicates a television program, broadcasting station (channel) or the like being outputted by the sound output apparatus 200. Since the sound acquisition apparatus 100 is a mobile phone having a television receiver function, it is configured to receive television broadcasting. In this case, the control unit 110 of the sound acquisition apparatus 100 determines that it is possible to obtain the sound source data from the sound source (in this case, television broadcasting) indicated by the sound source ID (step S312: Yes).

In this event, the control unit 110 starts up the functions necessary for obtaining the sound source data to obtain the sound source data (step S313). For example, when sound source data is obtained from the television broadcasting as in this example, the broadcasting receiver 140 is controlled by the control unit 110 to tune the channel to receive a television program based on the "sound source ID".

Once the sound acquisition apparatus 100 starts to obtain the sound source data, the control unit 110 executes the "Noise Suppression Processing" using the obtained sound source data (step S150).

This "Noise Suppression Processing" is substantially the same as processing shown in the first and second embodiments. In the "Noise Suppression Processing", for example, reference values previously designated apparatus by apparatus or sound source by sound source may be used for considering time difference between the sound data acquired by the sound acquisition unit 120 and the sound source data obtained by the broadcasting receiver 140. The reference values may be decided based on the time required for decoding depending on the apparatus. Further, the user of the sound acquisition apparatus 100 may change the reference values arbitrarily.

Then the "Noise Suppression Processing" ends as the result of a predetermined end event. After termination of the "Noise Suppression Processing", the control unit 110 determines whether the sound acquisition apparatus 100 has sent the "output notice request" before the terminated "Noise Suppression Processing" begins or not (step S314). Namely, though the sound acquisition apparatus 100 has broadcast the "output notice request" in a case where the noise suppression is carried out in response to the sound acquisition operation by the sound acquisition apparatus 100 as exemplified in the first embodiment, the "output notice request" has not been broadcasted in a case where the noise suppression is carried out in response to the sound output operation by the sound output apparatus 200.

In a case where the "output notice request" has been broadcast (step S314: Yes), the control unit 110 broadcasts a "transfer stop request" (step S315) so that each sound output apparatus 200 recognize that the "sound acquiring term" of the sound acquisition apparatus 100 concerned ended, then the control unit 110 terminates the processing.

On the other hand, if an "output notice request" has not been sent (step S314: No), the control unit 110 deletes the saved "output start notice" from the sound output apparatus 200 which outputted sound that was subjected to the noise suppression (step S316) in order to recognize that the "sound outputting term" of the sound output apparatus 200 concerned has ended, and terminates the processing.

If the "sound source ID" was not included in the information received from the sound output apparatus 200 (step S311: No), or in a case where it is not possible for the sound acquisition apparatus 100 to obtain the sound source data (step S312: No), the sound acquisition apparatus 100 requests transfer of "output sound data" to the sound output apparatus 200 as well as the first or second embodiment, and executes "Noise Suppression Processing" using the transferred "output sound data" (step S317, step S150).

According to the third embodiment, in a case where it is possible to obtain the sound data representing sound outputted by the sound output apparatus 200 from, for example, the television/radio broadcasting or the Internet (sound source), the sound acquisition apparatus 100 can obtain the sound data directly from such the sound sources, and use the obtained sound data for noise suppression. According to this structure, it is then no longer necessary to transfer the sound data from the sound output apparatus 200 to the sound acquisition apparatus 100. As a result, processing load in the sound output apparatus 200 and traffic loads on the communications network NW1 are reduced.

According to the above embodiments to which the present invention is applied, it is possible to effectively suppress noise such as acoustic echo.

For example, when the user talks on a mobile phone while watching television, it is possible to suppress sound outputted from a television from the sound to be transmitted to the called party. Further, when the user is inputting their voice into a voice recognition device while enjoying listening to music using an audio player, it is possible to suppress the sound output by the audio player from the inputted sound, thus preventing deterioration of voice recognition quality caused by extra sounds.

Since the sound acquisition apparatus according to the present invention may employ a signal converter like the sound acquisition unit 120 exemplified in the above embodiments which converts an analog sound signal into digital sound data, various methods for processing sound signals are applicable rather than filtering analog audio signals. For example, a filter having an arbitrary frequency response curve or a filter having an arbitrary pass band may be applicable for filtering audio signals.

Further, an arbitrary method may be adopted as a method for suppressing noise components caused by sound data (output sound data) representing sound emitted by the sound output apparatus from sound data representing sound acquired by the sound acquisition unit 120 after time synchronization by the time synchronization unit 111. It is therefore possible to easily implement noise suppression in an effective manner by applying typical echo canceling techniques.

Further, it is also possible for the sound acquisition apparatus 160 to calculate each transfer characteristic (for example, a transfer function) for sound reaching the sound acquisition apparatus 100 from each sound output apparatus 200 based on sweep signals etc. for the sound output apparatus 200. In this event, the adder 113 suppresses echo from the acquired sound data based on the transfer characteristics. It is also possible to improve the acoustic echo suppression performance at the sound acquisition apparatus as a result.

Further, the noise suppression system 1 may also be configured only by apparatuses where the distances among them are within a predetermined value or less. This predetermined value is then selected to give distances where, for example, the level of the sound signal transmitted through space is attenuated to less than a predetermined level. At this time, the acoustic echo suppression processing using the sound is omitted even for sound outputted by the sound output apparatus. As a result, it is possible to efficiently implement echo suppression processing.

Information indicating the distances among the apparatuses or GPS data representing positions of the apparatuses may be shared among the apparatuses on the communication network NW1. Further, the noise suppression system 1 may be configured only by apparatuses existing within the same premises (room).

It is further possible for each apparatus on the communication network NW1 to be capable of discerning whether or not other apparatuses are capable of requesting and responding to the sound output notices.

If the sound output apparatus does not start its sound output operation during the "sound acquiring term", immediate sound output may be omitted but the sound output apparatus 200 may broadcast an "output notice" before it starts the sound output operation. According to this modification, it is possible to notify the sound acquisition apparatus 100 that the sound output apparatus 200 starts to output sounds even if the sound acquisition apparatus 100 has not received an "output notice request" sent by the sound output apparatus 200 beforehand.

Even if the sound output apparatus 200 starts its sound output operation during the "sound acquiring term", the sound output apparatus 200 may broadcast an "output notice" instead of notifying only the sound acquisition apparatus 100 that the sound output operation has been started.

It is still further possible for the sound output apparatus 200 to start the output of sound using the same timing as the timing of the transfer of the "output sound data". According to this modification, the sound output apparatus 200 is also capable of suppressing acoustic echo due to sound outputted from the time of starting to output sound until the time of starting transfer of outputted sound data.

If the sound output apparatus 200 is able to mute the sound output based on the user operation, even if the sound acquisition apparatus 100 has requested a "sound output notice", the sound output apparatus 200 may be configured not to terminate the sound data transfer while muting the sound output. This modification may be applicable to both the first and second embodiments.

While muting the sound output, the sound output apparatus 200 may transfer, for example, silent sound data to the sound acquisition apparatus 100. In a case where the noise suppression system 1 operates as described in the second embodiment, the sound output apparatus 200 may be configured not to broadcast an "output end notice" after the sound data transfer is terminated.

The concept of the present invention is by no means limited to a dedicated system or apparatuses, but can also be applied, for example, to arbitrary apparatuses such as mobile phones, PDA, digital cameras, and the like having a sound acquisition function. That is, the noise suppression system, the sound acquisition apparatus, and the sound output apparatus according to the present invention will be realized by installing a computer program for causing a computer to function and operate as aforementioned sound acquisition apparatus 100 or sound output apparatus 200. Such computer program may be distributed as a recording medium storing the computer program or distributed through communication networks.

Various embodiments and changes may be made thereunto without departing from the broad spirit and scope of the invention. The above-explained embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

The present application is based on Japanese Patent Application No. 2007-195219 filed on Jul. 26, 2007, and including specification, claims, drawings and summary. The disclosure of the above Japanese Patent Application is incorporated herein by reference in its entirety.

What is claimed is:

1. A noise suppression system comprising:
   at least one sound acquisition apparatus for acquiring sounds; and
   at least one sound output apparatus for outputting sounds based on sound data being connected to the sound acquisition apparatus via a communication network,
   wherein the sound acquisition apparatus comprises:
      a sound data obtaining unit that obtains sound data representing sound output by the sound output apparatus, in response to start of a sound acquisition operation by the sound acquisition apparatus or in response to start of a sound output operation by the sound output apparatus; and
      a noise suppression unit that suppresses sound output by the sound output apparatus, using sound data obtained by the sound data obtaining unit, and wherein the sound output apparatus comprises:
- a request receiving unit that receives an "output notice request" requesting the sound output apparatus to notify the sound acquisition apparatus when the sound output apparatus starts a sound output operation and a "transfer stop request" requesting the sound output apparatus to stop sound data transfer operation, those broadcasted by the sound acquisition apparatus through the communication network; and
- a sound data transfer unit that transfers sound data representing sound being output by the sound output apparatus to the sound acquisition apparatus via the communication network, in a case where the sound output apparatus carries out a sound output operation within a term from a point where the request receiving unit receives the "output notice request" from the sound acquisition apparatus to a point where the request receiving unit receives the "transfer stop request" from the sound acquisition apparatus which is the sender of the received "output notice request".

2. The noise suppression system according to claim 1, wherein the sound data obtaining unit further comprises:
- a notification unit that notifies the sound output apparatus by broadcasting a notice indicating that the sound acquisition apparatus carries out a sound acquisition operation, to the communication network in a case where the sound acquisition apparatus obtains the sound data in response to start of the sound acquisition operation; and
- a request unit that requests, via the communication network, the sound output apparatus which responds to the notice to transfer the sound data.

3. The noise suppression system according to claim 1, wherein the sound output apparatus further comprises:
- a notification unit that notifies the sound acquisition apparatus by broadcasting a notice indicating that the sound output apparatus carries out a sound output operation, through the communication network in response to start of the sound output operation.

4. The noise suppression system according to claim 1, wherein the sound output apparatus further comprises a sound source information transmission unit that transmits sound source information indicating a sound source of the outputting sound, to the sound acquisition apparatus via the communication network, and
the sound data obtaining unit, in a case where the sound output apparatus provides the sound source information, obtains the sound data from the sound source.

5. A sound acquisition apparatus connected to a sound output apparatus via a communication network, which acquires sounds and utilizes the acquired sounds, comprising:
- a sound data obtaining unit that obtains sound data representing sound output by the sound output apparatus, in response to start of a sound acquisition operation by the sound acquisition apparatus or in response to start of a sound output operation by the sound output apparatus;
- a noise suppression unit that suppresses sound output by the sound output apparatus from the acquired sound using sound data obtained by the sound data obtaining unit; and
- a request broadcasting unit that broadcasts through the communication network an "output notice request" requesting the sound output apparatus to notify the sound acquisition apparatus when the sound output apparatus starts a sound output operation and a "transfer stop request" requesting the sound output apparatus to stop sound data transfer operation so that the sound output apparatus transfers sound data representing sound being output by the sound output apparatus to the sound acquisition apparatus via the communication network, in a case where the sound output apparatus carries out a sound output operation within a term from a point where the sound output apparatus receives the "output notice request" from the sound acquisition apparatus to a point where the sound output apparatus receives the "transfer stop request" from the sound acquisition apparatus which is the sender of the "output notice request" received by the sound output apparatus concerned.

6. The sound acquisition apparatus according to claim 5, wherein the sound data obtaining unit further comprises:
- a notification unit that notifies the sound output apparatus by broadcasting a notice indicating that the sound acquisition apparatus carries out a sound acquisition operation, through the communication network; and
- a transfer request unit that requests the sound output apparatus which responds to the notice by the notification unit to transfer the sound data, wherein the noise suppression unit carries out noise suppression using the sound data transferred by the sound output apparatus in response to the request by the transfer request unit.

7. The sound acquisition apparatus according to claim 5, wherein the sound data obtaining unit further comprises:
- a notice receiving unit that receives a start notice indicating that the sound output apparatus starts the sound output operation and an end notice indicating that the sound output apparatus terminates the sound output operation, those broadcasted by the sound output apparatus through the communication network; and
- a transfer request unit that requests the sound output apparatus which sent the notice received by the notice receiving unit to transfer the sound data, in a case where the sound acquisition apparatus starts a sound acquisition operation within a term from a point where the notice receiving unit receives the start notice to a point where the notice receiving unit receives the end notice from the sound output apparatus which is the sender of the received start notice,
wherein the noise suppression unit carries out the noise suppression using the sound data transferred by the sound output apparatus in response to the request by the transfer request unit.

8. The sound acquisition apparatus according to claim 5, wherein the sound data obtaining unit further comprises:
- a sound source information obtaining unit that obtains sound source information, transmitted by the sound output apparatus via the communication network, indicating a sound source of a sound output by the sound output apparatus, wherein the sound data obtaining unit obtains the sound data from the sound source based on sound source information obtained by the sound source information obtaining unit.

9. The sound acquisition apparatus according to claim 5, wherein the noise suppression unit further comprises:
- a synchronization unit that synchronizes the sound acquired by the sound acquisition apparatus with the sound data obtained by the sound data obtaining unit.

10. The sound acquisition apparatus according to claim 5, wherein the noise suppression unit further comprises:
- a delay unit that delays the sound data obtained by the sound data obtaining unit based on sound propagation from the sound output apparatus to the sound acquisition apparatus.

11. A sound output apparatus connected to a sound acquisition apparatus via a communication network, which outputs sounds based on sound data, comprising:

a request receiving unit that receives an "output notice request" requesting the sound output apparatus to notify the sound acquisition apparatus when the sound output apparatus starts a sound output operation and a "transfer stop request" requesting the sound output apparatus to stop sound data transfer operation, those broadcasted by the sound acquisition apparatus through the communication network; and a sound data transfer unit that transfers sound data representing sound being output by the sound output apparatus to the sound acquisition apparatus via the communication network, in a case where the sound output apparatus carries out a sound output operation within a term from a point where the request receiving unit receives the "output notice request" from the sound acquisition apparatus to a point where the request receiving unit receives the "transfer stop request" from the sound acquisition apparatus which is the sender of the received "output notice request".

12. The sound output apparatus according to claim 11, further comprising a sound source information transmission unit that transmits sound source information indicating a sound source of the outputting sound, to the sound acquisition apparatus via the communication network.

13. The sound output apparatus according to claim 11, further comprising:
a notification unit that broadcasts a start notice indicating that the sound output apparatus carries out the sound output operation through the communication network, in response to the sound output apparatus starting the sound output operation;
wherein the a sound data transfer unit transfers the sound data to the sound acquisition apparatus which responds to the start notice, via the communication network.

14. A non-transitory computer-readable medium storing a computer program that controls a computer of a sound acquisition apparatus connected to a sound output apparatus via a communication network, which acquires sounds and utilizes the acquired sounds, to implement:
a function of obtaining sound data representing sound being output by the sound output apparatus in response to start of a sound acquisition operation by the sound acquisition apparatus or in response to start of a sound output operation by the sound output apparatus;
a function of broadcasting through the communication network an "output notice request" requesting the sound output apparatus to notify the sound acquisition apparatus when the sound output apparatus starts a sound output operation and a "transfer stop request" requesting the sound output apparatus to stop sound data transfer operation so that the sound output apparatus transfers sound data representing sound being output by the sound output apparatus to the sound acquisition apparatus via the communication network, in a case where the sound output apparatus carries out a sound output operation within a term from a point where the sound output apparatus receives the "output notice request" from the sound acquisition apparatus to a point where the sound output apparatus receives the "transfer stop request" from the sound acquisition apparatus which is the sender of the "output notice request" received by the sound output apparatus concerned; and
a function of suppressing sound output by the sound output apparatus from the acquired sound, using the obtained sound data.

15. A non-transitory computer-readable medium storing a computer program that controls a computer of a sound output apparatus connected to a sound acquisition apparatus via a communication network, which outputs sounds based on sound data, to implement:
a function of receiving an "output notice request" requesting the sound output apparatus to notify start of sound output operation by the sound output apparatus and a "transfer stop request" requesting the sound output apparatus to stop the sound data transfer to the sound acquisition apparatus, those broadcasted by the sound acquisition apparatus through the communication network; and
a function of transferring sound data representing sound being output by the sound output apparatus to the sound acquisition apparatus via the communication network, when the sound output apparatus starts to output the sound during a term from a point where the sound output apparatus receives the "output notice request" from the sound acquisition apparatus to a point where the sound output apparatus receives the "transmission stop request" from the sound acquisition apparatus which is the sender of the received "output notice request".

* * * * *